US006434271B1

(12) United States Patent
Christian et al.

(10) Patent No.: US 6,434,271 B1
(45) Date of Patent: Aug. 13, 2002

(54) TECHNIQUE FOR LOCATING OBJECTS WITHIN AN IMAGE

(75) Inventors: Andrew Dean Christian, Lincoln; Brian Lyndall Avery, Lexington, both of MA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/020,043

(22) Filed: Feb. 6, 1998

(51) Int. Cl.[7] ................................................. G06K 9/46
(52) U.S. Cl. ..................... 382/194; 382/103; 382/199; 382/203; 382/266; 382/291; 348/169; 348/415.1
(58) Field of Search ............................ 382/174, 187, 382/190–199, 103, 168, 203, 266, 286, 291; 348/169, 415.1; 707/20

(56) References Cited

U.S. PATENT DOCUMENTS

| | | | |
|---|---|---|---|
| 4,644,582 A | 2/1987 | Morishita et al. ............ 382/6 |
| 4,821,029 A | 4/1989 | Logan et al. ............... 340/712 |
| 4,851,616 A | 7/1989 | Wales et al. ................. 178/18 |
| 5,048,103 A | 9/1991 | Leclerc ........................ 382/44 |
| 5,067,015 A | 11/1991 | Combridge et al. ........ 358/133 |
| 5,105,186 A | 4/1992 | May ............................ 340/784 |
| 5,280,610 A | 1/1994 | Travis, Jr. et al. .......... 395/600 |
| 5,376,947 A | 12/1994 | Kurode ........................ 345/173 |
| 5,440,744 A | 8/1995 | Jacobson et al. ........... 395/650 |
| 5,459,636 A | * 10/1995 | Gee et al. ..................... 707/20 |
| 5,487,115 A | * 1/1996 | Surka .......................... 382/296 |
| 5,551,027 A | 8/1996 | Choy et al. ................. 395/600 |
| 5,581,758 A | 12/1996 | Burnett et al. .............. 395/614 |
| 5,630,017 A | 5/1997 | Gasper et al. ............. 395/2.85 |
| 5,640,468 A | * 6/1997 | Hsu ............................. 382/190 |
| 5,640,558 A | 6/1997 | Li ................................ 395/612 |
| 5,652,880 A | 7/1997 | Seagraves ................... 395/614 |
| 5,652,882 A | 7/1997 | Doktor ........................ 395/617 |
| 5,657,426 A | 8/1997 | Waters et al. .............. 395/2.85 |
| 5,748,804 A | * 5/1998 | Surka .......................... 382/291 |
| 5,764,283 A | * 6/1998 | Pingali et al. .............. 348/169 |
| 5,845,007 A | * 12/1998 | Ohashi et al. .............. 382/199 |
| 5,947,169 A | * 10/1999 | Bachelder ................... 382/151 |
| 6,335,985 B1 | * 1/2002 | Sambonsugi et al. ....... 382/190 |

OTHER PUBLICATIONS

Describing Motion for Recognition, Little, et al., 1995 IEEE, pp. 235–240.
Compact Representations of Videos Through Dominant and Multiple Motion Estimation, Sawhney, et al. IEEE 1996, pp. 814–830.
Registration of Images with Geometric Distortions. Ardeshir Goshtasby, vol. 26, Jan. 1988, pp. 60–64.The Integration of Optical Flow and Deformable Models with Applications to Human Face Shape and Motion Estimation, DeCarlo, et al. IEEE 1996, pp. 231–238.
The Integration of Optical Flow and Deformable Models with Applications to Human Face Shape and Motion Estimation, decarlo, et al. IEEE 1996, pp. 231–238.
A Vision System for Observing and Extracting Facial Action Parameters, Essa, et al. IEEE 1994, pp. 76–83.
Realistic Modeling for Facila Animation, Lee, et al, *Computer Graphics Proceedings, Annual Confeence Series,* 1995, pp. 55–62

(List continued on next page.)

*Primary Examiner*—Jose L. Couso
*Assistant Examiner*—Gregory Desire
(74) *Attorney, Agent, or Firm*—Cesari and McKenna, LLP; Edwin H. Paul

(57) ABSTRACT

A technique for locating objects within an image is disclosed. In one embodiment, the technique is realized by obtaining an image and then identifying an object within the image based upon an orientation of the object within the image. The image can be a representation of a plurality of pixels, wherein the plurality of pixels are arranged in a plurality of columns and rows, and wherein at least some of the plurality of pixels are enabled to represent the object.

54 Claims, 14 Drawing Sheets

OTHER PUBLICATIONS

Facial Feature Localization and Adaptation of a Generic Face Model for Model–Based Coding, Reinders, et al., Signal Processing: Image Communication vol. 7, pp. 57–74, 1995.

Real—time Recognition of Activity Using Temporal Templates, Aaron F Bobick, et al. *The Workshop on Applications of Computer Vision* Dec. 1996., pp. 1–5.

3D Human Body Model Acquistion from Multiple Views, Kakadiaris et al., IEEE, 1995, pp. 618–623.

Analyzing Articulated Motion Using Expectation—Maximation, Rowley, et al. *Computer Vision and Pattern Recognition* San Juan, PR, Jun. 1997, Total of 7 pages.

Mixture Modesl for Optical Flo9r Computation. Jepson. et al., University of toronto. *Depart of Computer Science,* Apr. 1993, pp. 1–16.

Analyzing and Recognizing Walking Figures in XYT, Niyogi, et al. IEEE 1994. pp. 469–474.

Nonparametric Recognition of Nonrigid Motion. Polana. et al, *Department of Computer Science,* pp. 1–29.

Model–Based Tracking of Self–Occluding Articulated Objects. Rehg. et al., *5th Intl. Conf. OnComputer Vision* Cambridge, Ma, Jun. 1995 total od 6 pages.

A Unified Mixture Framework For Motion Segmentation: Incorporating Spatial Coherence and Estimating The Number of Models, Weiss, et al., IEEE 1996, pp. 321–326.

Learning visual Behavior for Gesture Analysis, Wilson, et al. IEEE 1995, pp. 229–234.

* cited by examiner

TECHNIQUE FOR LOCATING OBJECTS WITHIN AN IMAGE

FIELD OF THE INVENTION

The present invention relates generally to visual recognition systems and, more particularly, to a technique for locating objects within an image.

BACKGROUND OF THE INVENTION

An interface to an automated information dispensing kiosk represents a computing paradigm that differs from the conventional desktop environment. That is, an interface to an automated information dispensing kiosk differs from the traditional Window, Icon, Mouse and Pointer (WIMP) interface in that such a kiosk typically must detect and communicate with one or more users in a public setting. An automated information dispensing kiosk therefore requires a public multi-user computer interface.

Prior attempts have been made to provide a public multi-user computer interface and/or the constituent elements thereof. For example, a proposed technique for sensing users is described in "Pfinder: Real-time Tracking of the Human Body", Christopher Wren, Ali Azarbayejani, Trevor Darrell, and Alex Pentland, IEEE 1996. This technique senses only a single user, and addresses only a constrained virtual world environment. Because the user is immersed in a virtual world, the context for the interaction is straight-forward, and simple vision and graphics techniques are employed. Sensing multiple users in an unconstrained real-world environment, and providing behavior-driven output in the context of that environment present more complex vision and graphics problems which are not addressed by this technique.

Another proposed technique is described in "Real-time Self-calibrating Stereo Person Tracking Using 3-D Shape Estimation from Blob Features", Ali Azarbayejani and Alex Pentland, ICPR January 1996. The implementing system uses a self-calibrating blob stereo approach based on a Gaussian color blob model. The use of a Gaussian color blob model has a disadvantage of being inflexible. Also, the self-calibrating aspect of this system may be applicable to a desktop setting, where a single user can tolerate the delay associated with self-calibration. However, in an automated information dispensing kiosk setting, some form of advance calibration would be preferable so as to allow a system to function immediately for each new user.

Other proposed techniques have been directed toward the detection of users in video sequences. The implementing systems are generally based on the detection of some type of human motion in a sequence of video images. These systems are considered viable because very few objects move exactly the way a human does. One such system addresses the special case where people are walking parallel to the image plane of a camera. In this scenario, the distinctive pendulum-like motion of human legs can be discerned by examining selected scan-lines in a sequence of video images. Unfortunately, this approach does not generalize well to arbitrary body motions and different camera angles.

Another system uses Fourier analysis to detect periodic body motions which correspond to certain human activities (e.g., walking or swimming). A small set of these activities can be recognized when a video sequence contains several instances of distinctive periodic body motions that are associated with these activities. However, many body motions, such as hand gestures, are non-periodic, and in practice, even periodic motions may not always be visible to identify the periodicity.

Another system uses action recognition to identify specific body motions such as sitting down, waving a hand, etc. In this approach, a set of models for the actions to be recognized are stored and an image sequence is filtered using the models to identify the specific body motions. The filtered image sequence is thresholded to determine whether a specific action has occurred or not. A drawback of this system is that a stored model for each action to be recognized is required. This approach also does not generalize well to the case of detecting arbitrary human body motions.

Recently, an expectation-maximization (EM) technique has been proposed to model pixel movement using simple affine flow models. In this technique, the optical flow of images is segmented into one or more independent rigid body motion models of individual body parts. However, for the human body, movement of one body part tends to be highly dependent on the movement of other body parts. Treating the parts independently leads to a loss in detection accuracy.

The above-described proposed techniques either do not allow users to be detected in a real-world environment in an efficient and reliable manner, or do not allow users to be detected without some form of clearly defined user-related motion. These shortcomings present significant obstacles to providing a fully functional public multi-user computer interface. Accordingly, it would be desirable to overcome these shortcomings and provide a technique for allowing a public multi-user computer interface to detect users.

OBJECTS OF THE INVENTION

The primary object of the present invention is to provide a technique for locating objects within an image.

The above-stated primary object, as well as other objects, features, and advantages, of the present invention will become readily apparent from the following detailed description which is to be read in conjunction with the appended drawings.

SUMMARY OF THE INVENTION

According to the present invention, a technique for locating objects within an image is provided. The technique can be realized by having a processing device such as, for example, a digital computer, obtain an image. The processing device then identifies an object within the image based upon an orientation of the object within the image.

The orientation of the object within the image can be such that the object has a first orientation within the image. For example, if the object is a upright standing human, the first orientation is a vertical orientation.

The image can be, for example, a representation of a plurality of pixels, wherein at least some of the plurality of pixels are enabled to represent the object. The plurality of pixels can be configured to have a second orientation. For example, if the plurality of pixels are configured in a plurality of columns, the second orientation is a vertical orientation.

It should be noted that the first and second orientations do not have to be identical. For example, the first orientation could be a diagonal orientation, and the second orientation could be a horizontal orientation, or vice versa.

Regardless of the direction of orientation, the processing device can identify an object within the image by first counting each enabled pixel along the second orientation. The processing device can then identify portions of the representation having a quantity of enabled pixels exceeding a threshold value.

The processing device can further thereby identify an object within the image by first grouping together substantially adjacent identified portions of the representation. The processing device can then identify areas of the representation corresponding to each group of substantially adjacent identified portions of the representation.

The processing device can further thereby identify an object within the image by first recording the locations of the outermost enabled pixels within each group of substantially adjacent identified portions of the representation. The processing device can then frame areas of the representation coinciding with the locations of the outermost enabled pixels within each group of substantially adjacent identified portions of the representation.

The plurality of pixels can also be configured to have a third orientation. For example, if the plurality of pixels are also configured in a plurality of rows, the third orientation is a horizontal orientation.

It should be noted that the second and third orientations should not be identical. For example, the second orientation and the third orientation could be orthogonal.

The processing device can further thereby identify an object within the image by first counting each enabled pixel in each framed area along the third orientation. The processing device can then identify portions of each framed area having a quantity of enabled pixels exceeding a threshold value.

The processing device can further thereby identify an object within the image by first grouping together substantially adjacent identified portions of each framed area. The processing device can then identify areas of each framed area corresponding to each group of substantially adjacent identified portions of each framed area.

The processing device can further thereby identify an object within the image by first recording the locations of the outermost enabled pixels within each group of substantially adjacent identified portions of each framed area. The processing device can then frame areas of each framed area coinciding with the locations of the outermost enabled pixels within each group of substantially adjacent identified portions of each framed area.

In a more specific embodiment, the plurality of pixels can be arranged in a plurality of columns and rows. If such is the case, the processing device can thereby identify an object within the image by first counting each enabled pixel in each of the plurality of columns and rows. The processing device can then identify each of the plurality of columns having a quantity of enabled pixels exceeding a column threshold value, and identify each of the plurality of rows having a quantity of enabled pixels exceeding a row threshold value.

The processing device can further thereby identify an object within the image by first grouping together substantially adjacent identified columns, and grouping together substantially adjacent identified rows. The processing device can then identify areas of the representation corresponding to each group of substantially adjacent identified columns, and identify areas of the representation corresponding to each group of substantially adjacent identified rows.

The processing device can further thereby identify an object within the image by first recording the locations of the outermost enabled pixels within each group of substantially adjacent identified columns, and recording the locations of the outermost enabled pixels within each group of substantially adjacent identified rows. The processing device can then frame areas of the representation coinciding with the locations of the outermost enabled pixels within each group of substantially adjacent identified columns, and frame areas of the representation coinciding with the locations of the outermost enabled pixels within each group of substantially adjacent identified rows.

The processing device can further thereby identify an object within the image by first overlaying the areas of the representation that were framed to coincide with the locations of the outermost enabled pixels within each group of substantially adjacent identified columns with the areas of the representation that were framed to coincide with the locations of the outermost enabled pixels within each group of substantially adjacent identified rows. The processing device can then identify common overlayed areas as areas of the representation that contain a significant number of enabled pixels.

The image can be a first representation of a plurality of first pixels representing a difference between a second representation of a plurality of second pixels and a third representation of a plurality of third pixels, wherein each of the plurality of first pixels is enabled to represent a difference between a corresponding one of the plurality of second pixels and a corresponding one of the plurality of third pixels, wherein the object is represented by at least some of the enabled first pixels.

The first representation can be, for example, a first electrical representation of a mask image that indicates the difference between corresponding pixels in the second and third plurality of pixels. The first electrical representation can be stored, for example, as digital data on a tape, disk, or other memory device for manipulation by the processing device.

The second representation can be, for example, a second electrical representation of an image of a scene that is captured by a camera at a first point in time and then digitized to form the plurality of second pixels. The second electrical representation can be stored on the same or another memory device for manipulation by the processing device.

The third representation can be, for example, a third electrical representation of an image of the scene that is captured by a camera at a second point in time and then digitized to form the plurality of third pixels. The third electrical representation can be stored on the same or another memory device for manipulation by the processing device.

Thus, the first representation typically represents a difference in the scene at the first point in time as compared to is the scene at the second point in time.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF THE INVENTION

Figure 1:
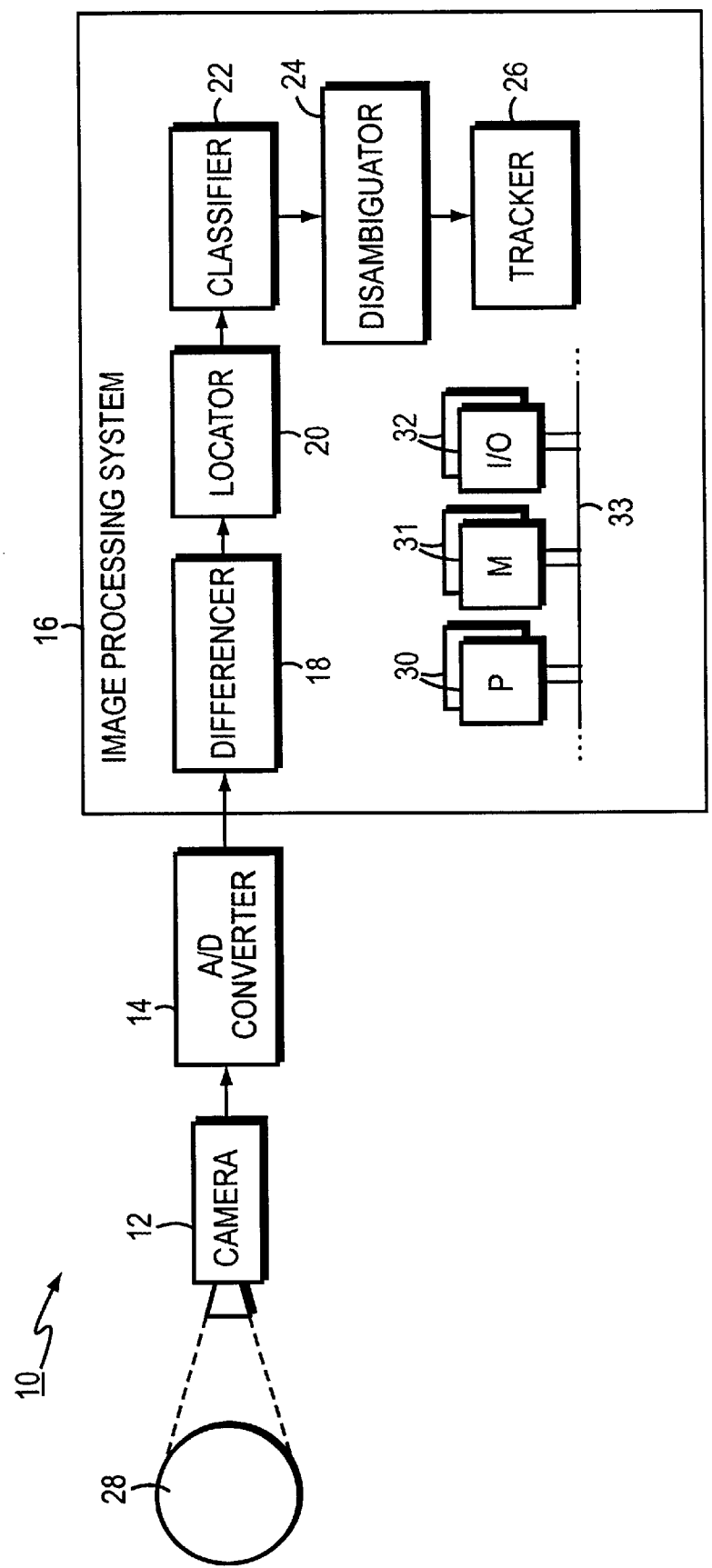
FIG. 1 is a schematic diagram of a vision system in accordance with the present invention.

Referring to FIG. 1, there is shown a schematic diagram of a vision system 10 in accordance with the present invention. The vision system 10 comprises a camera 12 which is coupled to an optional analog-to-digital (A/D) converter 14. The optional A/D converter 14 is coupled to a image processing system 16. The image processing system 16 comprises a differencer 18, a locator 20, a classifier 22, a disambiguator 24, and a tracker 26.

The camera 12 may be of a conventional analog variety, or it may be of a digital type. If the camera 12 is a digital type of camera, then the optional A/D converter 14 is not required. In either case, the camera 12 operates by capturing an image of a scene 28. A digitized version of the captured image of the scene 28 is then provided to the image processing system 16.

The differencer 18, the locator 20, the classifier 22, the disambiguator 24, and the tracker 26 are preferably implemented as software programs in the image processing system 16. Thus, the image processing system 16 also preferably comprises at least one processor (P) 30, memory (M) 31, and input/output (I/O) interface 32, which are connected to each other by a bus 33, for implementing the functions of the differencer 18, the locator 20, the classifier 22, the disambiguator 24, and the tracker 26.

Figure 2:
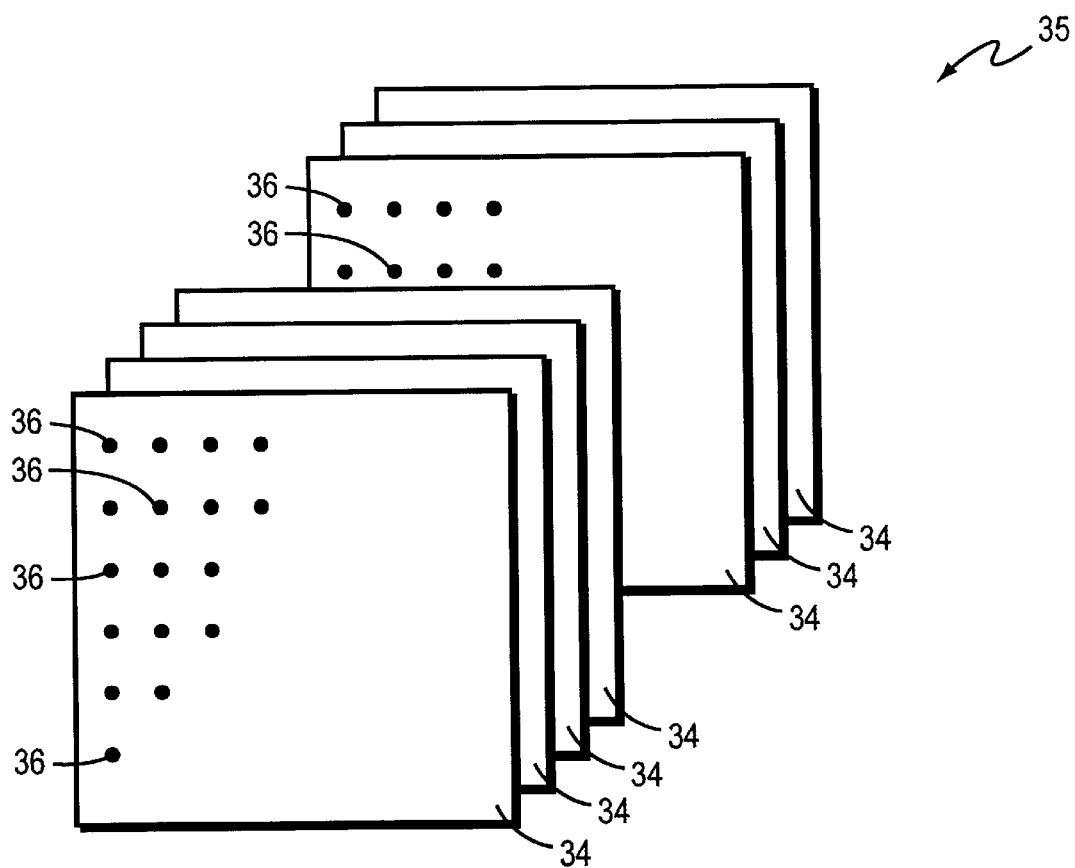
FIG. 2 shows a video sequence of temporally ordered frames which are organized as arrays of pixels.

As previously mentioned, the camera 12 captures an image of the scene 28 and a digitized version of the captured image is provided to the image processing system 16. Referring to FIG. 2, the digitized version of each captured image takes the form of a frame 34 in a video sequence of temporally ordered frames 35. The video sequence of temporally ordered frames 35 may be produced, for example, at a rate of thirty per second. Of course, other rates may alternatively be used.

Each frame 34 is organized as an array of pixels 36. Each pixel 36 has a light intensity value for a corresponding portion of the captured image of the scene 28. The pixels 36 may have color values, although the present invention may also be practiced with the pixels 36 not having color values. Typically, the value of each pixel 36 is stored as digital data on a tape, disk, or other memory device, such as the memory 31, for manipulation by the image processing system 16.

The video sequence of temporally ordered frames 35 is presented to the image processing system 16 via the I/O interface 32. The digital data representing the value of each pixel 36 may be stored in the memory 31 at an address that corresponds to the location of each pixel 36 in a corresponding frame 34. Machine executable instructions of operating system and application software programs, which may also be stored in the memory 31, are executed by the processor 30 to manipulate the digital data representing the value of each pixel 36. Thus, in the preferred embodiment described herein, the functions of the differencer 18, the locator 20, the classifier 22, the disambiguator 24, and the tracker 26 are implemented by the processor 30 through the execution of machine executable instructions, as described in detail below.

In the preferred embodiment described herein, the vision system 10 is used to identify a person in a single digitized image, and then track the person through a succession of digitized images. It should be noted, however, that the vision system 10 can be used to identify essentially any type of object in a single digitized image, and then track the object through a succession of digitized images. The vision system 10 accomplishes these tasks in part through the use of a background-differencing algorithm which uses luminance and chrominence information, as described in detail below.

The differencer 18 operates by storing a "background" image and then comparing each subsequently stored "source" image to the background image. The background image and the source images are digitized versions of images of the scene 28 that are captured by the camera 12. Thus, the background image and the source images make up the frames 34 that make up the video sequence of temporally ordered frames 35.

The background image forms a default or base image to which all of the source images are compared. In its simplest form, the background image can be an image that is captured when it is known that no extraneous objects (e.g., a person) are within the field of view of the camera 12. However, the background image is more typically formed by averaging together a number of source images (e.g., the last ten captured source images). This allows the background image to be continuously updated every time a new source image is captured (e.g., every 5 seconds), which allows environmental changes, such as subtle changes in lighting conditions, to be gradually incorporated into the background image.

The above-described time-averaged background image updating scheme also allows more prominent changes to be gradually incorporated, or not incorporated, into the background image. That is, if the vision system 10 determines, through a differencing algorithm that is described in detail below, that there are extraneous objects (e.g., a person or a potted plant) within the field of view of the camera 12, and hence within one or more captured source images, then the background image can be selectively updated to gradually incorporate, or not incorporate, these extraneous objects into the background image. For example, if the vision system 10 determines, through the differencing algorithm that is described in detail below, that there is an extraneous object (e.g., a person or a potted plant) within the field of view of the camera 12, and hence within one or more captured source images, then the background image is updated without using the area in each captured source image that corresponds to the extraneous object. That is, the background image is selectively updated to not incorporate the extraneous object into the background image.

If at some later time the vision system 10 determines, through a classifying, a disambiguating, or a tracking algorithm that is described in detail below, that the extraneous object is not an object of interest (e.g., a potted plant), then the background image is updated using the area in each captured source image that corresponds to the extraneous object to gradually incorporate the extraneous object into the background image. That is, the background image is selectively updated to gradually incorporate the extraneous object into the background image.

On the other hand, if at some later time the vision system 10 determines, through the classifying, the disambiguating, or the tracking algorithms that are described in detail below, that the extraneous object is an object of interest (e.g., a person), then the background image continues to be updated without using the area in each captured source image that corresponds to the extraneous object. That is, the background image continues to be selectively updated so as to not incorporate the extraneous object into the background image. For example, an object may be considered an object of interest if the object has moved within a preselected amount of time.

At this point it should be noted that in all of the above-described time-averaged background image updating scenarios, the background image is always updated using the areas in each captured source image that do not correspond to the extraneous object. Also, the above-described time-averaged background image updating scheme allows certain objects to "fade" from within the background image. For example, if an object was present within one or more prior captured source images, but is no longer present within more recent captured source images, then as the number of more recent captured source images within which the object is no longer present increases with time, the object will fade from within the background image as more of the more recent captured source images are averaged together to form the background image.

Source images can be captured by the camera 12 at literally any time, but are typically captured by the camera 12 subsequent to the capturing, or forming, of the background image. Source images often contain extraneous objects (e.g., a person) which are to be identified and tracked.

As previously mentioned, the differencer 18 operates by comparing each source image to the background image. Each frame 34 in the video sequence of temporally ordered frames 35, including the background image and all of the source images, is in YUV color space. YUV color space is a standard used by, for example, television cameras. The Y-component corresponds to the brightness or luminance of an image, the U-component corresponds to the relative amount of blue light that is in an image, and the V-component corresponds to the relative amount of red light that is in an image. Together, the U and V components specify the chrominence of an image.

Figure 3:
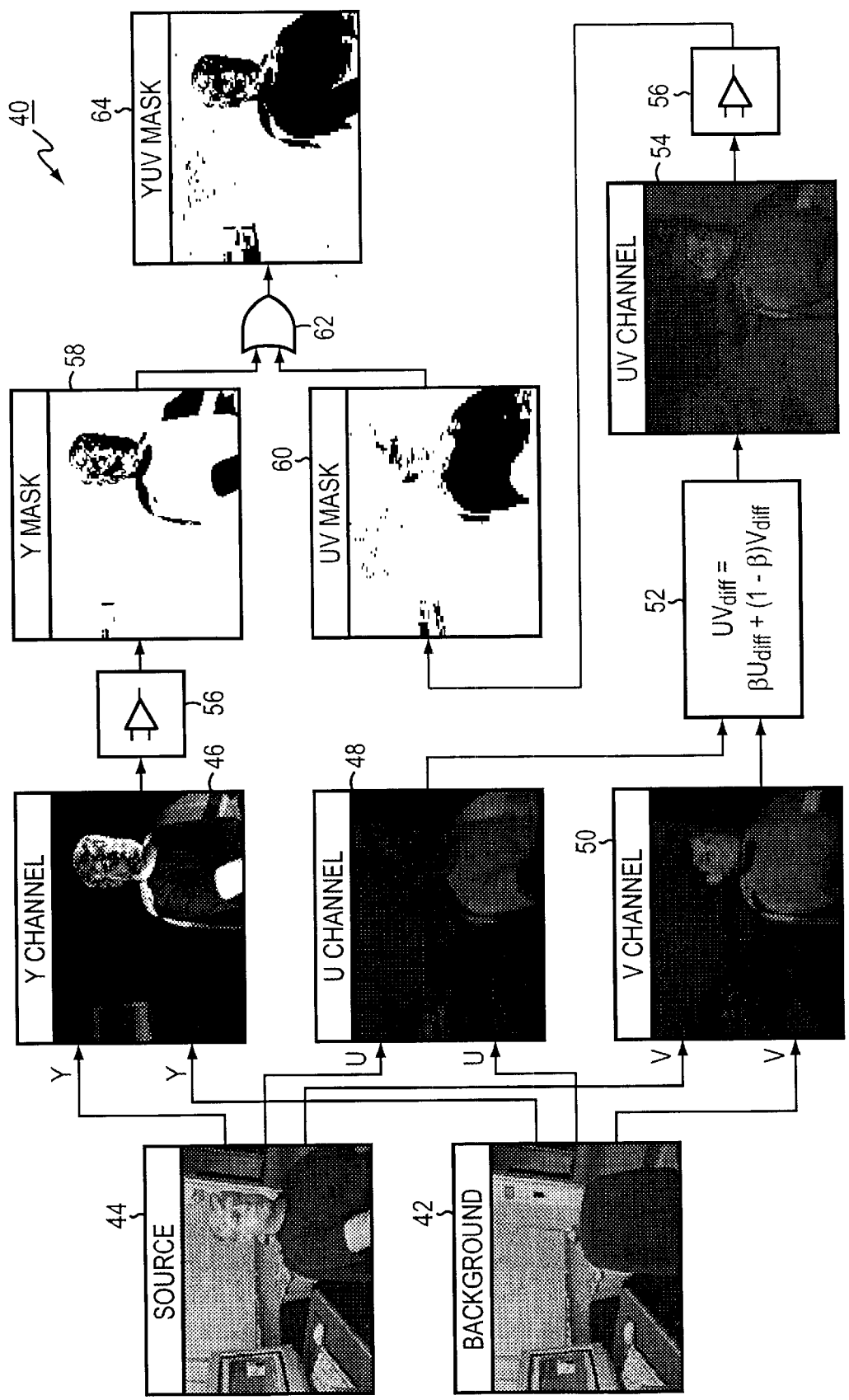
FIG. 3 is a flowchart diagram of a differencing algorithm in accordance with the present invention.

Referring to FIG. 3, there is shown a flowchart diagram of a differencing algorithm 40 in accordance with the present invention. A background image 42 and a source image 44 are both provided in YUV format. The individual Y, U, and V components are extracted from both the background image 42 and the source image 44. The individual Y, U, and V components from the background image 42 and the source image 44 are then differenced to form corresponding Y, U, and V difference images. That is, a Y-difference image 46 is formed by subtracting the Y-component value for each pixel in the background image 42 from the Y-component value for a corresponding pixel in the source image 44, a U-difference image 48 is formed by subtracting the U-component value for each pixel in the background image 42 from the U-component value for a corresponding pixel in the source image 44, and a V-difference image 50 is formed by subtracting the V-component value for each pixel in the background image 42 from the V-component value for a corresponding pixel in the source image 44. The value of each resulting pixel in the Y, U, and V difference images may be negative or positive.

Next, a weighting operation 52 is performed on corresponding pixels in the U-difference image 48 and the V-difference image 50. That is, a weighted average is computed between corresponding pixels in the U-difference image 48 and the V-difference image 50. This results in a UV-difference image 54. The formula used for each pixel is as follows:

$$UV_{diff} = \beta U_{diff} + (1-\beta) V_{diff} \qquad (1)$$

wherein the value of $\beta$ is between 0 and 1. Typically, a $\beta$-value of approximately 0.25 is used, resulting in a greater weight being given to the V-component than the U-component. This is done for two reasons. First, human skin contains a fair amount of red pigment, so humans show up well in V color space. Second, the blue light component of most cameras is noisy and, consequently, does not provide very clean data.

Next, a thresholding operation 56 is performed on each pixel in the Y-difference image 46 and the UV-difference image 54. That is, the value of each pixel in the Y-difference image 46 and the UV-difference image 54 is thresholded to convert each pixel to a boolean value corresponding to either "on" or "off". A separate threshold value may be selected for both the Y-difference image 46 and the UV-difference image 54. Each threshold value may be selected according to the particular object (e.g., a person) to be identified by the vision system 10. For example, a high threshold value may be selected for the Y-difference image 46 if the object (e.g., a person) to be identified is known to have high luminance characteristics.

The result of thresholding each pixel in the Y-difference image 46 and the UV-difference image 54 is a Y-mask image 58 and a UV-mask image 60, respectively. Literally, the Y-mask image 58 represents where the source image 44 differs substantially from the background image 42 in luminance, and the UV-mask image 60 represents where the source image 44 differs substantially from the background image 42 in chrominence.

Next, a boolean "OR" operation 62 is performed on corresponding pixels in the Y-mask image 58 and the UV-mask image 60. That is, each pixel in the Y-mask image 58 is boolean "OR" functioned together with a corresponding pixel in the UV-mask image 60. This results in a combined YUV-mask image 64. The YUV-mask image 64 represents where the source image 44 differs substantially in luminance and chrominence from the background image 42. More practically, the YUV-mask image 64 shows where the source image 44 has changed from the background image 42. This change can be due to lighting changes in the scene 28 (e.g., due to a passing cloud), objects entering or exiting the scene 28 (e.g., people, frisbees, etc.), or objects in the scene 28 that change visually (e.g., a computer monitor running a screen saver). In the preferred embodiment described herein, the change corresponds to the presence of a human.

The locator 20 operates by framing areas in the YUV-mask image 64 using a thresholding scheme, and then overlaying the framed areas to locate specific areas in the YUV-mask image 64 that represent where the source image 44 differs substantially in luminance and chrominence from the background image 42, as determined by the differencer 18. The specific areas are located, or identified, based upon an orientation of each area in the YUV-mask image 64.

Figure 4:
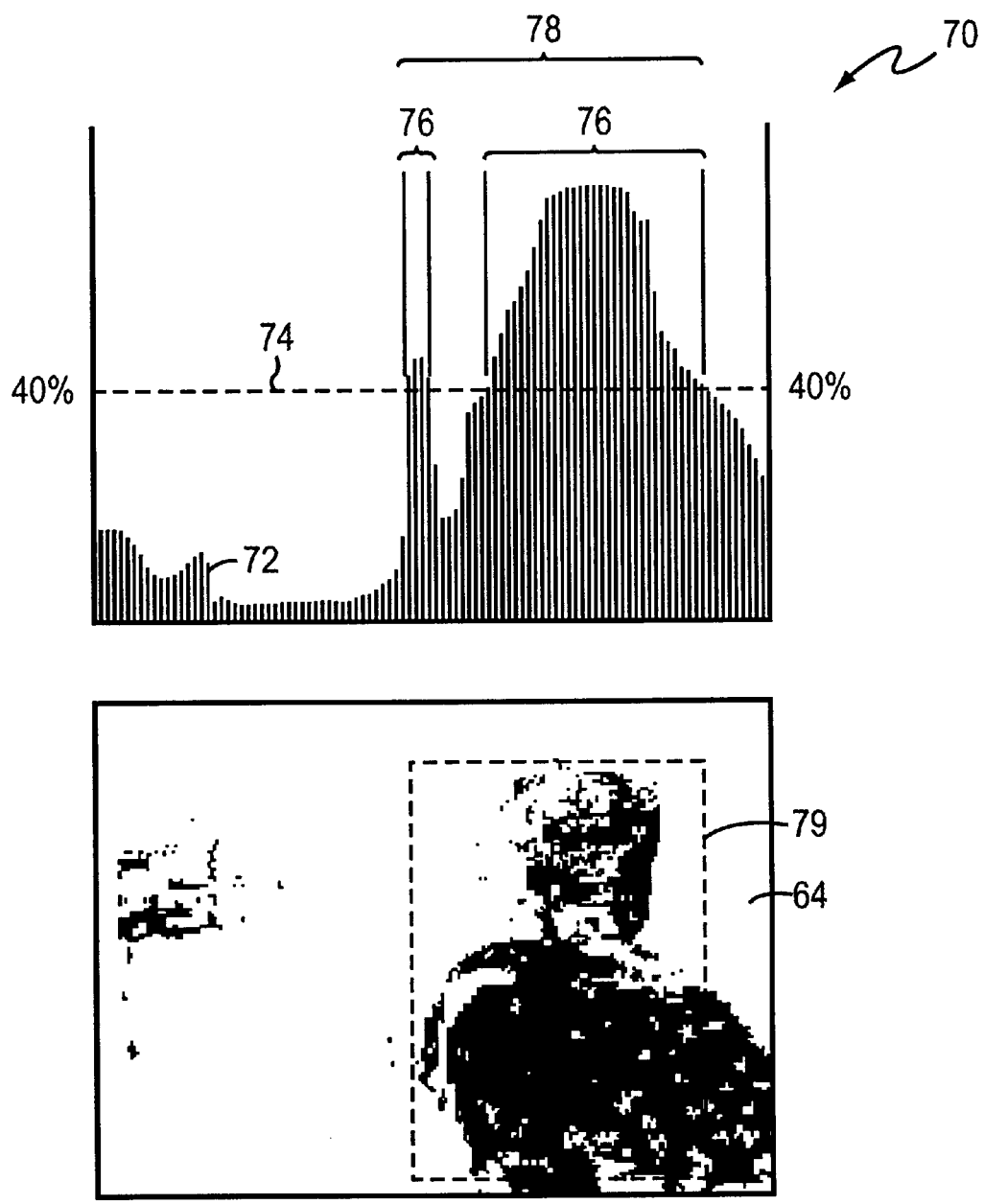
FIG. 4 shows a vertical histogram for a YUV-mask image in accordance with the present invention.

Referring to FIG. 4, the locator 20 first divides the YUV-mask image 64 into vertical columns (not shown for purposes of figure clarity) and then counts the number of pixels that are turned "on" in each column of the YUV-mask image 64. The locator 20 uses this information to form a vertical histogram 70 having vertical columns 72 which correspond to the vertical columns of the YUV-mask image 64. The height of each column 72 in the vertical histogram 70 corresponds to the number of pixels that are turned "on" in each corresponding column of the YUV-mask image 64.

Next, the locator 20 thresholds each column 72 in the vertical histogram 70 against a selected threshold level 74. That is, the height of each column 72 in the vertical histogram 70 is compared to the threshold level 74, which in this example is shown to be 40%. Thus, if more than 40% of the pixels in a column of the YUV-mask image 64 are turned "on", then the height of the corresponding column 72 in the vertical histogram 70 exceeds the 40% threshold level 74. In contrast, if less than 40% of the pixels in a column of the YUV-mask image 64 are turned "on", then the height of the corresponding column 72 in the vertical histogram 70 does not exceed the 40% threshold level 74.

Next, the locator 20 groups adjacent columns in the vertical histogram 70 that exceed the threshold level into column sets 76. The locator 20 then joins column sets that are separated from each other by only a small gap to form merged column sets 78. The locator 20 then records the vertical limits of each remaining column set. That is, the location of the highest pixel that is turned "on" in a column of the YUV-mask image 64 that corresponds to a column 72 in a column set of the vertical histogram 70 is recorded. Similarly, the location of the lowest pixel that is turned "on" in a column of the YUV-mask image 64 that corresponds to a column 72 in a column set of the vertical histogram 70 is recorded.

Next, the locator 20 places a frame 79 around each area in the YUV-mask image 64 that is defined by the outermost columns that are contained in each column set of the vertical histogram 70, and by the highest and lowest pixels that are turned "on" in each column set of the vertical histogram 70. Each frame 79 therefore defines an area in the YUV-mask image 64 that contains a significant number of pixels that are turned "on", as determined in reference to the threshold level 74.

Figure 5:
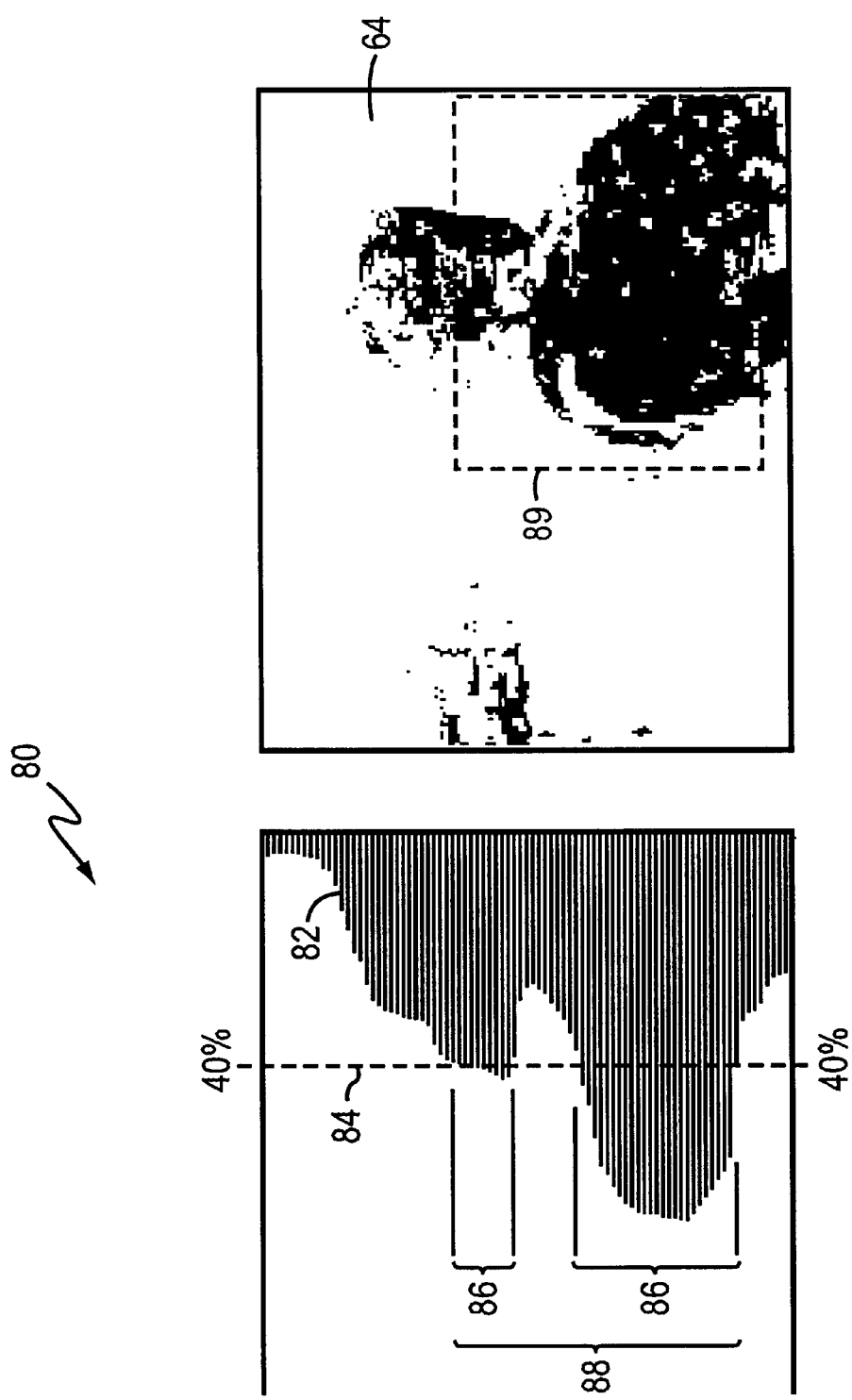
FIG. 5 shows a first embodiment of a horizontal histogram for a YUV-mask image in accordance with the present invention.

Referring to FIG. 5, the locator 20 repeats the above-described operations, but in the horizontal direction. That is, the locator 20 first divides the YUV-mask image 64 into horizontal rows (not shown for purposes of figure clarity) and then counts the number of pixels that are turned "on" in each row of the YUV-mask image 64. The locator 20 uses this information to form a horizontal histogram 80 having horizontal rows 82 which correspond to the horizontal rows of the YUV-mask image 64. The length of each row 82 in the horizontal histogram 80 corresponds to the number of pixels that are turned "on" in each corresponding row of the YUV-mask image 64.

Next, the locator 20 thresholds each row 82 in the horizontal histogram 80 against a selected threshold level 84. That is, the length of each row 82 in the horizontal histogram 80 is compared to the threshold level 84, which in this example is shown to be 40%. Thus, if more than 40% of the pixels in a row of the YUV-mask image 64 are turned "on", then the length of the corresponding row 82 in the horizontal histogram 80 exceeds the 40% threshold level 84. In contrast, if less than 40% of the pixels in a row of the YUV-mask image 64 are turned "on", then the length of the corresponding row 82 in the horizontal histogram 80 does not exceed the 40% threshold level 84.

Next, the locator 20 groups adjacent rows in the horizontal histogram 80 that exceed the threshold level into row sets 86. The locator 20 then joins row sets that are separated from each other by only a small gap to form merged row sets 88. The locator 20 then records the horizontal limits of each remaining row set. That is, the location of the leftmost pixel that is turned "on" in a row of the YUV-mask image 64 that corresponds to a row 82 in a row set of the horizontal histogram 80 is recorded. Similarly, the location of the rightmost pixel that is turned "on" in a row of the YUV-mask image 64 that corresponds to a row 82 in a row set of the horizontal histogram 80 is recorded.

Next, the locator 20 places a frame 89 around each area in the YUV-mask image 64 that is defined by the outermost rows that are contained in each row set of the horizontal histogram 80, and by the leftmost and rightmost pixels that are turned "on" in each row set of the horizontal histogram 80. Each frame 89 therefore defines an area in the YUV-mask image 64 that contains a significant number of pixels that are turned "on", as determined in reference to the threshold level 84.

Figure 6:
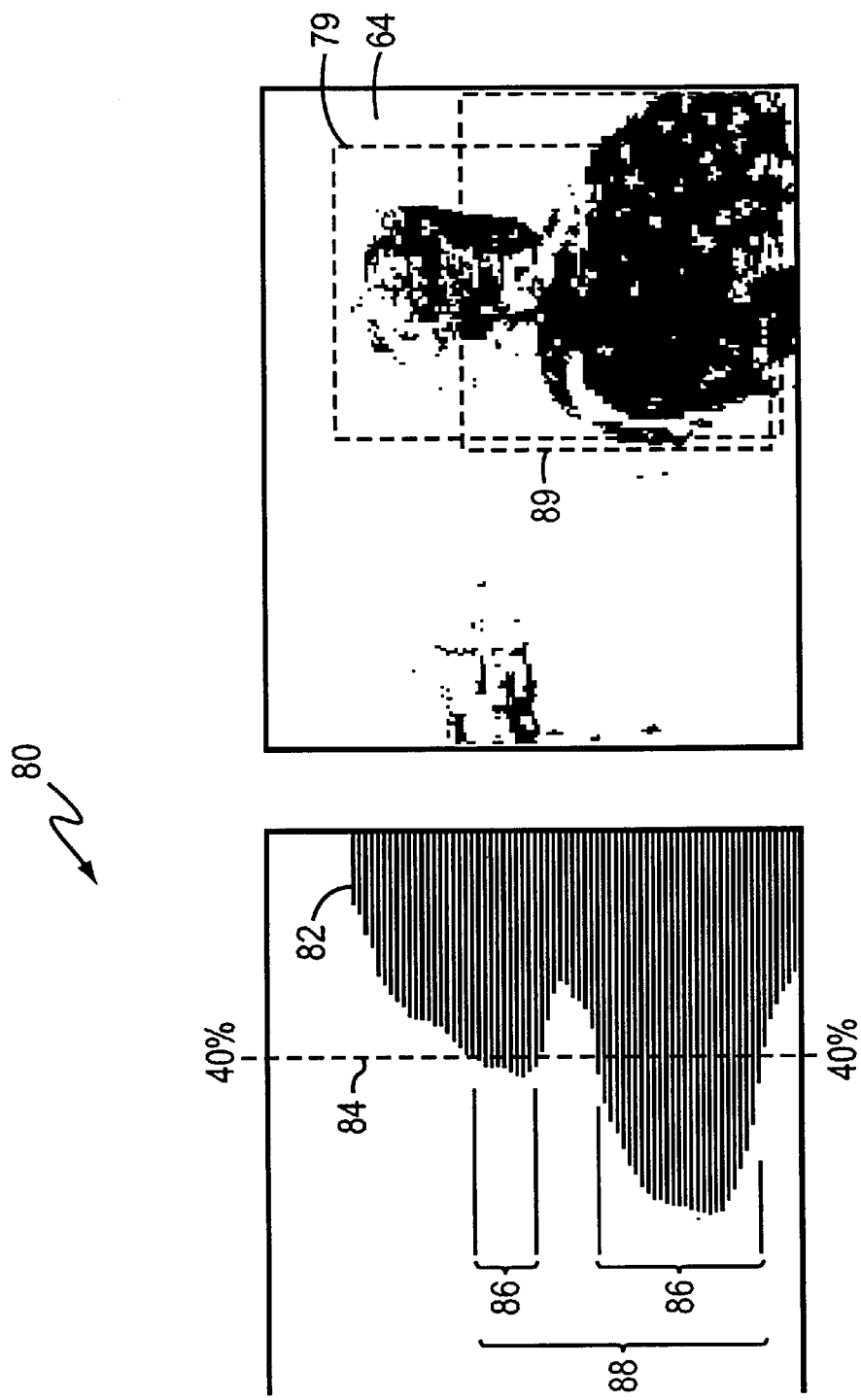
FIG. 6 shows a second embodiment of a horizontal histogram for a YUV-mask image in accordance with the present invention.

At this point it should be noted that the locator 20 may alternatively perform the horizontal histogramming operation described above on only those areas in the YUV-mask image 64 that have been framed by the locator 20 during the vertical histogramming operation. For example, referring to FIG. 6, the locator 20 can divide the YUV-mask image 64 into horizontal rows (not shown for purposes of figure clarity) in only the area defined by the frame 79 that was obtained using the vertical histogram 70. The locator 20 can then proceed as before to count the number of pixels that are turned "on" in each row of the YUV-mask image 64, to form the horizontal histogram 80 having horizontal rows 82 which correspond to the horizontal rows of the YUV-mask image 64, to threshold each row 82 in the horizontal histogram 80 against a selected threshold level 84, to group adjacent rows in the horizontal histogram 80 that exceed the threshold level into row sets 86 and merged row sets 88, and to place a frame 89 around each area in the YUV-mask image 64 that is defined by the outermost rows that are contained in each row set of the horizontal histogram 80, and by the leftmost and rightmost pixels that are turned "on" in each row set of the horizontal histogram 80. By performing the horizontal histogramming operation on only those areas in the YUV-mask image 64 that have been framed by the locator 20 during the vertical histogramming operation, the locator 20 eliminates unnecessary processing of the YUV-mask image 64.

Figure 7:
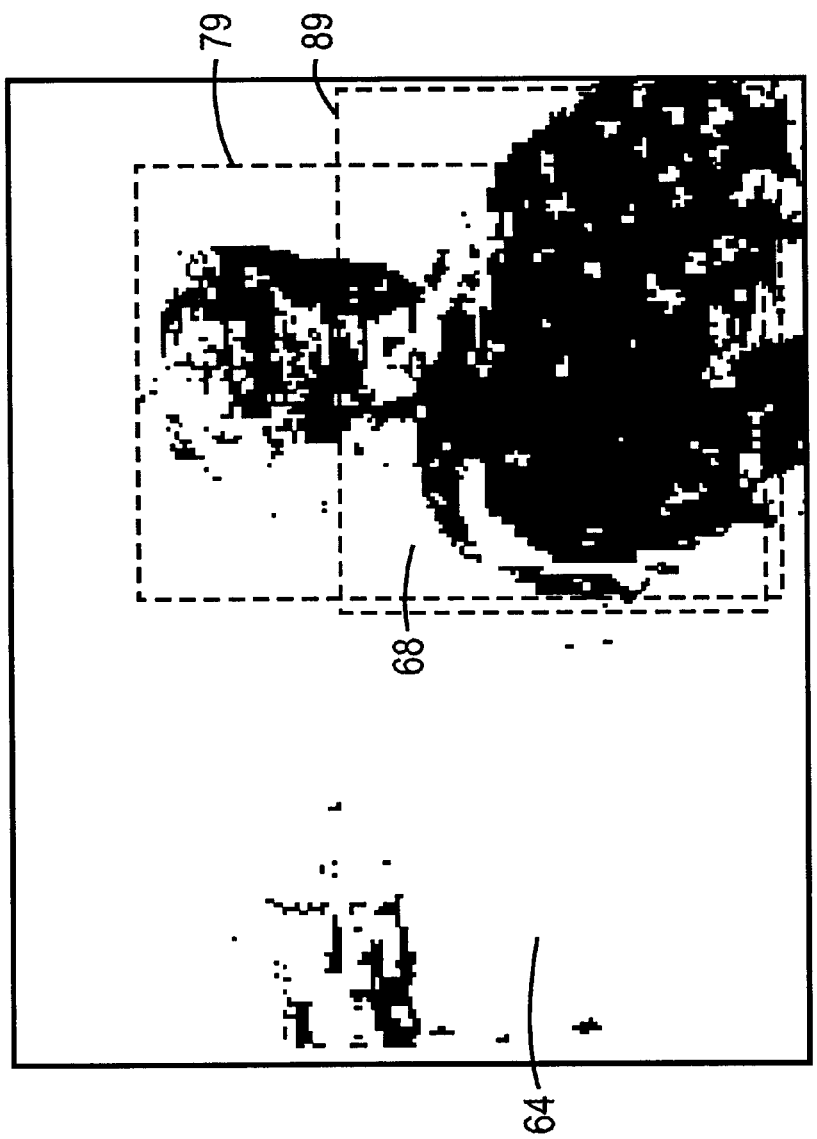
FIG. 7 shows overlaid frames on a YUV-mask image in accordance with the present invention.

Referring to FIG. 7, the locator 20 next overlays the frames 79 and 89 that were obtained using the vertical histogram 70 and the horizontal histogram 80, respectively, to locate areas 68 that are common to the areas defined by the frames 69 and 70. The locations of these common areas 68, of which only one is shown in this example, are the locations of areas in the YUV-mask image 64 that represent where the source image 44 differs substantially in luminance and chrominence from the background image 42, as determined by the differencer 18. In the preferred embodiment described herein, these areas 68 are likely to contain a human.

It should be noted that although the locator 20, as described above, divides the YUV-mask image 64 into vertical columns and horizontal rows, it is within the scope of the present invention to have the locator 20 divide the YUV-mask image 64 in any number of manners. For example, the locator 20 can divide the YUV-mask image 64 into diagonal sections, and then count the number of pixels that are turned "on" in each diagonal section of the YUV-mask image 64. Thus, it is within the scope of the present invention that the above described columns and rows can be oriented in any number of directions besides just the vertical and horizontal directions described above.

Figure 8:
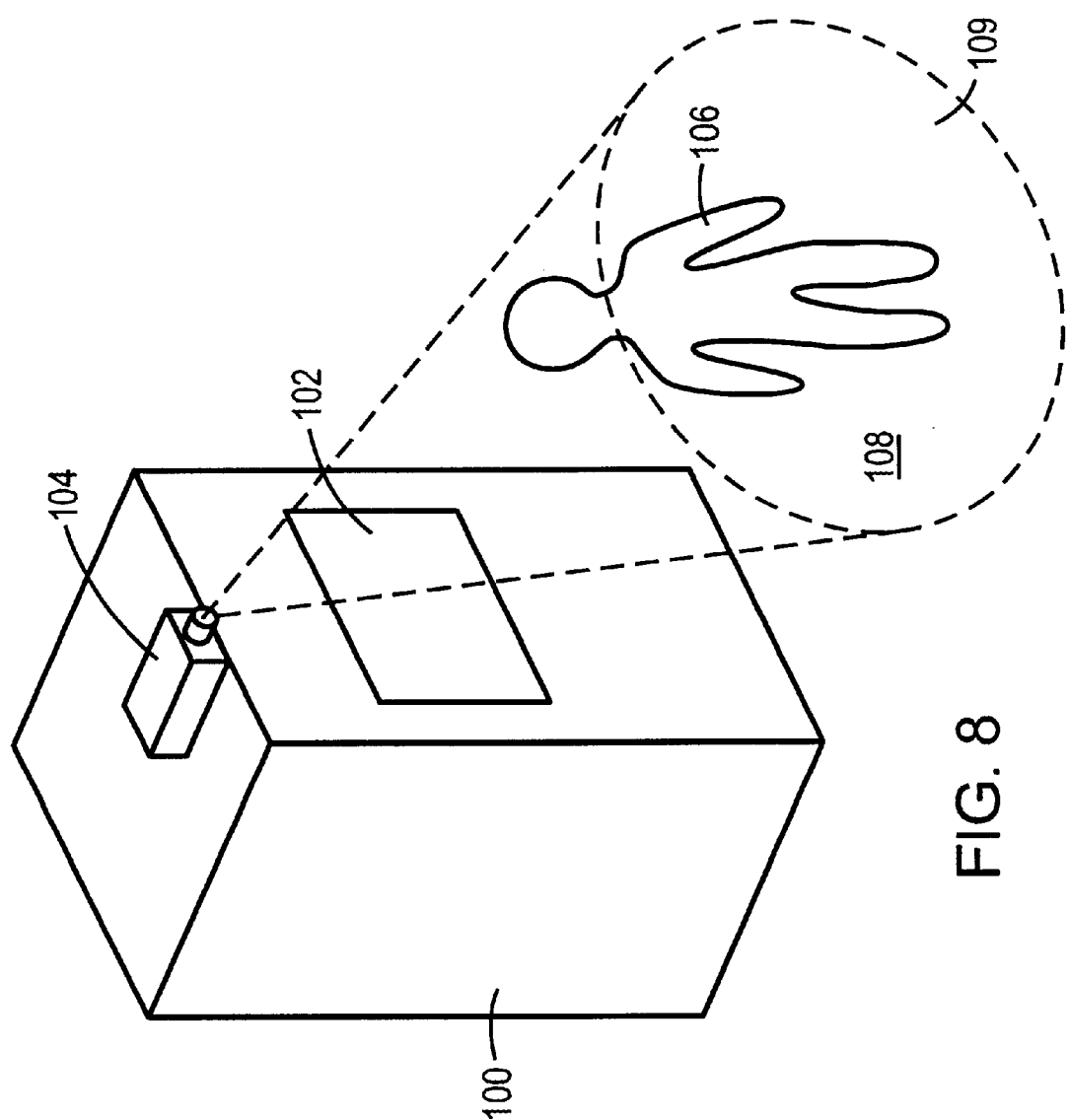
FIG. 8 shows a public kiosk having an interactive touch-screen monitor and a video camera in accordance with the present invention.

The classifier 22 operates by filtering each area 68 in the YUV-mask image 64 that was located by the locator 20 for human characteristics. More specifically, the classifier 22 operates by. filtering each area 68 in the YUV-mask image 64 for size, location, and aspect ratio. In order for the classifier 22 to perform the filtering operation, the position and the orientation of the camera 12 must be known. For example, referring to FIG. 8, there is shown a public kiosk 100 having an interactive touchscreen monitor 102 mounted therein and a video camera 104 mounted thereon. The interactive touchscreen monitor 102 provides an attraction for a passing client 106, while the video camera 104 allows the passing client 106 to be detected in accordance with the present invention. The video camera 104 is mounted at an angle on top of the public kiosk 100 such that the field of view of the video camera 104 encompasses a region 108 in front of the public kiosk 100. The region 108 includes the terrain 109 upon which the passing client 106 is standing or walking. The terrain 109 provides a reference for determining the size and location of the passing client 106, as described in detail below.

Figure 9:
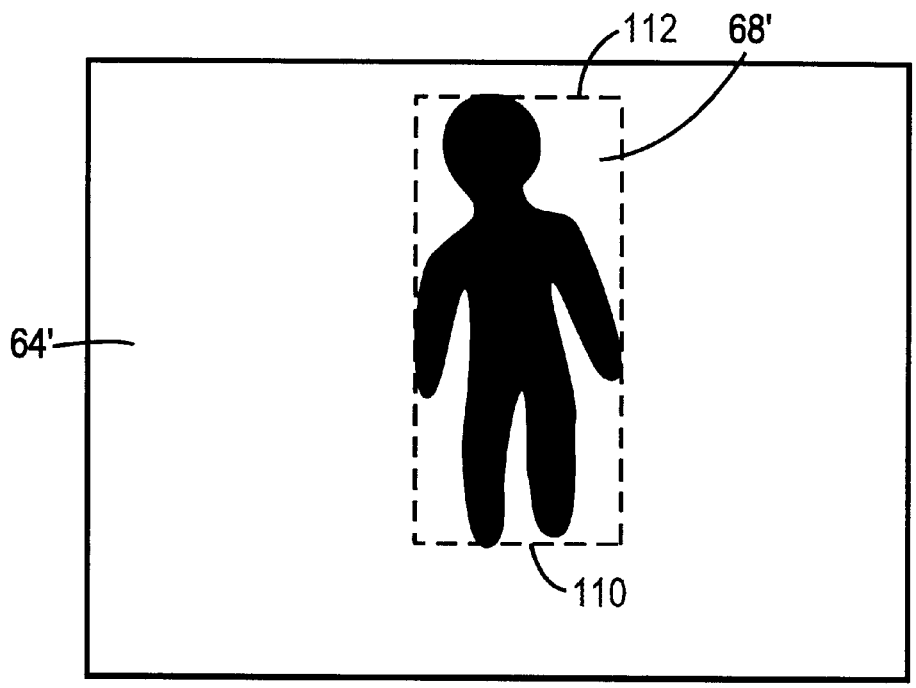
FIG. 9 shows a first area in a YUV.-mask image in accordance with the present invention.
Figure 10:
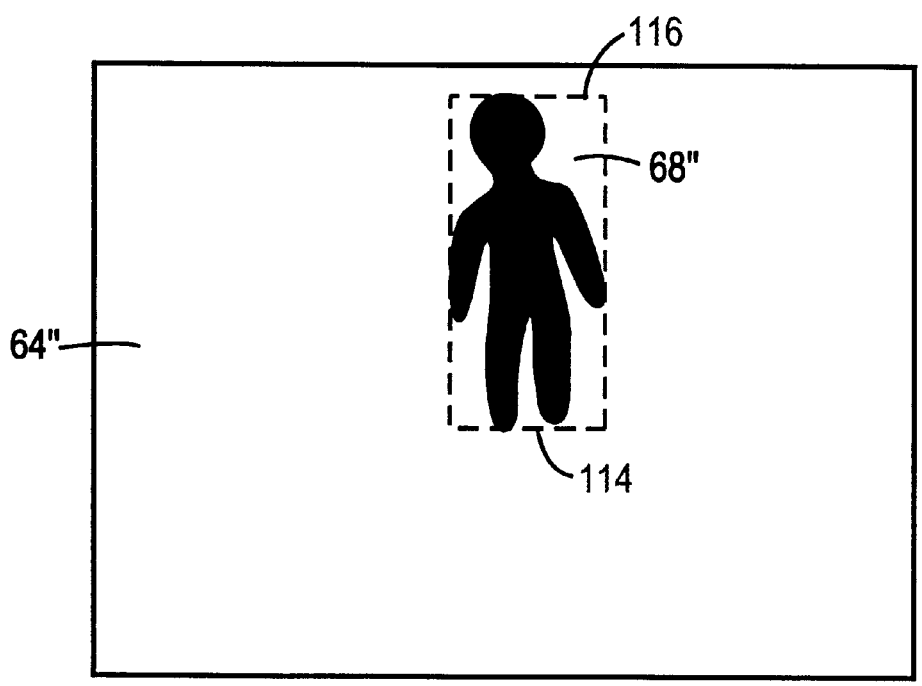
FIG. 10 shows a second area in a YUV-mask image in accordance with the present invention.

Referring to FIG. 9, if the passing client 106 is a six-foot tall human standing approximately three feet away from the public kiosk 100, then the passing client 106 will show up as an area 68' in a YUV-mask image 64' having a bottom edge 110 located at the bottom of the YUV-mask image 64' and a top edge 112 located at the top of the YUV-mask image 64'. On the other hand, referring to FIG. 10, if the passing client 106 is a six-foot tall human standing approximately twenty feet away from the public kiosk 100, then the passing client 106 will show up as an area 68" in a YUV-mask image 64" having a bottom edge 114 located in the middle of the YUV-mask image 6" and a top edge 116 located at the top of the YUV-mask image 6".

With the position and the orientation of the video camera 104 known, as well as the size and the location of an area 68 within a YUV-mask image 64, calculations can be made to determine the relative size and location (e.g., relative to the public kiosk 100) of an object (e.g., the client 106) that was located by the locator 20 and is represented by an area 68 in a YUV-mask image 64. That is, given the position and the orientation of the video camera 104 and the location of the bottom edge of an area 68 in a YUV-mask image 64, a first calculation can be made to obtain the distance (e.g., in feet and inches) between the public kiosk 100 and the object (e.g., the client 106) that was located by the locator 20 and is represented by the area 68 in the YUV-mask image 64.

Given the distance between the public kiosk 100 and the object, as well as the size of the area 68 in a YUV-mask image 64, a second calculation can be made to obtain the actual size of the object (e.g., in feet and inches). At this point, three useful characteristics are known about the object: the distance between the public kiosk 100 and the object (in feet and inches), the height of the object (in feet and inches), and the width of the object (in feet and inches).

The classifier 22 can now filter each area 68 in the YUV-mask image 64 for size, location, and aspect ratio. For example, assuming that there is only an interest in identifying humans over the height of four feet, the classifier 22 will filter out those objects that are shorter than four feet in height. Also, assuming that there is only an interest in identifying humans who come within ten feet of the public kiosk 100, the classifier 22 will filter out those objects that are further than ten feet away from the public kiosk 100. Furthermore, assuming that there is only an interest in identifying a single human, the classifier 22 will filter out those objects that are taller than seven feet in height (e.g., the typical maximum height of a human) and larger than three feet in width (e.g., the typical maximum width of a human).

If an area 68 in a YUV-mask image 64 that was located by the locator 20 is large enough to contain more than one human (e.g., a crowd of humans), then the classifier 22 typically only filters the area 68 in the YUV-mask image 64 for size (i.e., to eliminate small objects) and location (i.e., to eliminate objects too far away from the public kiosk 100). The area 68 in the YUV-mask image 64 is then passed on to the disambiguator 24 for further processing, as described in detail below.

It should be noted that the classifier 22 can also filter areas of a YUV mask image according to other characteristics such as, for example, texture and color.

In view of the foregoing, it will be recognized that the classifier 22 can be used to identify large humans (e.g., adults), small humans (e.g., children), or other objects having associated sizes. Thus, the vision system 10 can be used to identify objects having specific sizes.

The disambiguator 24 operates by further processing each area 68 in a YUV-mask image 64 that was classified by the classifier 22 as containing more than one human (e.g., a crowd of humans). More specifically, the disambiguator 24 operates by identifying discontinuities in each area 68 in the YUV-mask image 64 that was classified by the classifier 22 as containing more than one human (e.g., a crowd of humans). The identified discontinuities are then used by the disambiguator 24 to divide each area 68 in the YUV-mask image 64 that was classified by the classifier 22 as containing more than one human (e.g., a crowd of humans). The disambiguator 24 then filters each divided area in the YUV-mask image 64 for size, location, and aspect ratio so that each individual human can be identified within the crowd of humans. Thus, the disambiguator 24 operates to disambiguate each individual human from the crowd of humans.

Figure 11:
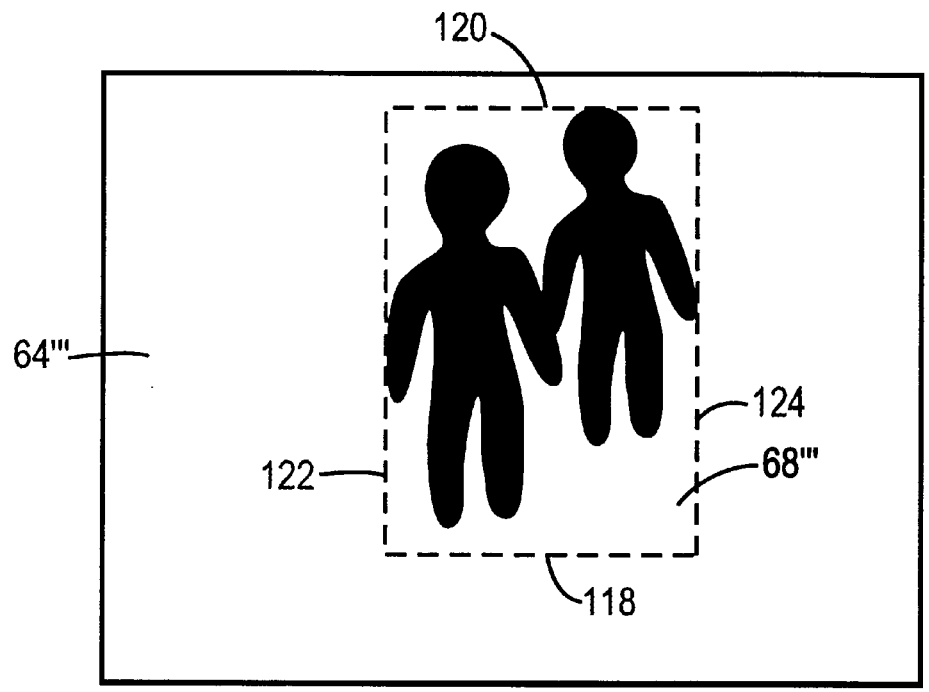
FIG. 11 shows a YUV-mask image having an area that was classified as an area containing more than one human in accordance with the present invention.
Figure 12A:
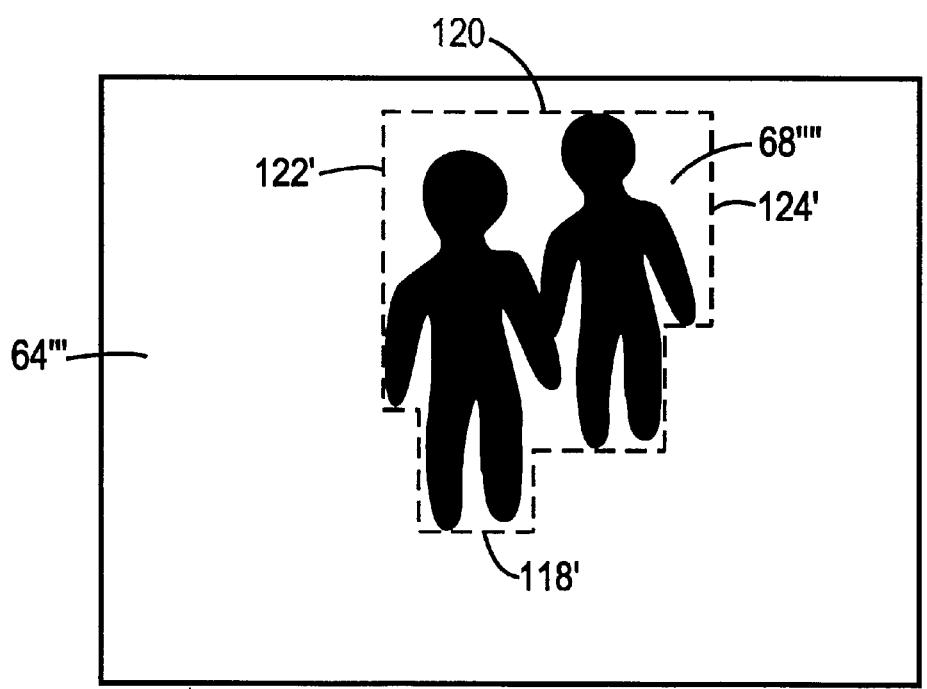
FIG. 12A shows a YUV-mask image having a first redefined area in accordance with the present invention.

Referring to FIG. 11, there is shown a YUV-mask image 64''' having an area 68''' that was classified by the classifier 22 as an area containing more than one human. The area 68''' has a bottom edge 118, a top edge 120, a left edge 122, and a right edge 124. In a public kiosk application, the disambiguator 24 is most beneficially used to identify the human (i.e., the client) that is closest to the public kiosk. The disambiguator 24 accomplishes this task by identifying discontinuities along the bottom edge 118 of the area 68''', and then using the identified discontinuities to divide the area 68'''. Referring to FIG. 12A, the YUV-mask image 64''' is shown having a redefined area 68''' that is defined by a bottom edge 118', the top edge 120, a left edge 122', and a right edge 124'. The discontinuities that are shown along the bottom edge 118' of the redefined area 68'''' are identified by identifying the location of the lowest pixel that is turned "on" in each column (see FIG. 4) that passes through the area 68''' in the YUV-mask image 64'''. The bottom edge 118' of the redefined area 68'''' coincides with the locations of the lowest pixels that are turned "on" in groups of some minimum number of columns that pass through the area 68''' in the YUV-mask image 64'''. It should be noted that the left edge 122' and the right edge 124' of the area 68'''' in the YUV-mask image 64''' are shortened because of the identified discontinuities that are shown along the bottom edge 118' of the redefined area 68''''.

Next, the disambiguator 24 divides the redefined area 68'''' in the YUV-mask image 64''' according to the identified discontinuities. For example, referring to FIG. 12B, the redefined area 68'''' is divided into four subareas 68a'''' 68b'''', 68c'''', and 68d'''' according to the discontinuities that were identified as described above.

After the redefined area 68'''' has been divided into the four subareas 68a'''', 68b'''', 68c'''', and 68d'''', the disambiguator 24 filters each of the four subareas 68a'''', 68b'''', 68c'''', and 68d'''' for size, location, and aspect ratio so that each individual human can be identified within the crowd of humans. For example, subareas 68a'''' and 68d'''' can be filtered out since they are too small to contain a human. The remaining two subareas, however, subareas 68b'''' and 68c'''', pass through the filter of the disambiguator 24 since each of these areas is large enough to contain a human, is shaped so as to contain a human (i.e., has a suitable aspect ratio), and is located at a suitable location within in the YUV-mask image 64'''. The disambiguator 24 can thereby identify these remaining two subareas as each containing a human. Thus, the disambiguator 24 can disambiguate individual humans from a crowd of humans.

It should be noted that, similar to the filtering operation of the classifier 22, the filtering operation of the disambiguator 24 requires that the position and orientation of the camera 12 be known in order to correctly filter for size, location, and aspect ratio.

Figure 13:
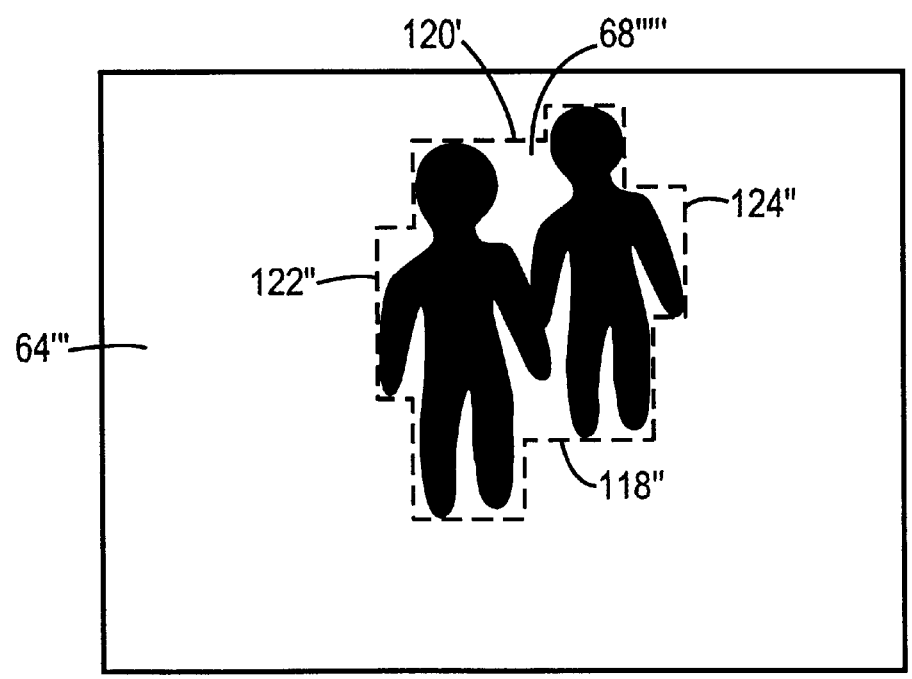
FIG. 13 shows a YUV-mask image having a second redefined area in accordance with the present invention.

At this point it should be noted that the disambiguator 24 can also identify discontinuities along the top edge 120, the left edge 122, and the right edge 124 of the area 68''' in the YUV-mask image 64'''. For example, the disambiguator 24 can identify discontinuities along both the bottom edge 118 and the top edge 120 of the area 68''' in the YUV-mask image 64'''. Referring to FIG. 13, the YUV-mask image 64''' is shown having a redefined area 68'''' that is defined by a bottom edge 118", a top edge 120', a left edge 122", and a right edge 12". The bottom edge 118" of the redefined area 68'''' coincides with the locations of the lowest pixels that are turned "on" in groups of some minimum number of columns that pass through the area 68''' in the YUV-mask image 64''', while the top edge 120' of the redefined area 68'''' coincides with the locations of the highest pixels that are turned "on" in groups of some minimum number of columns that pass through the area 68''' in the YUV-mask image 64'''. The minimum number of columns in each group of columns can be the same or different for the bottom edge 118" and the top edge 120'. Again, it should be noted that the left edge 122" and the right edge 124" of the area 68'''' in the YUV-mask image 64''' are shortened because of the identified discontinuities that are shown along the bottom edge 118" and the top edge 120' of the redefined area 68''''. By identifying discontinuities along more than one edge of the area 68''', a more accurate representation of each identified area is obtained.

Figure 12B:
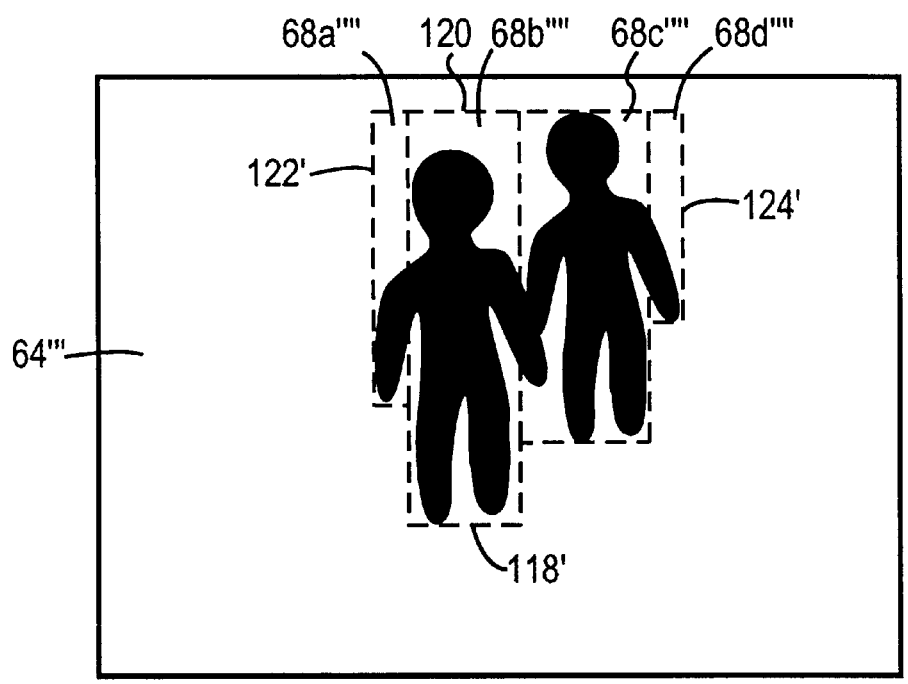
FIG. 12B shows a YUV-mask image having a divided first redefined area in accordance with the present invention.

The disambiguator 24 can divide the redefined area 68'''' shown in FIG. 13 in a similar manner to that described with respect to FIG. 12B. The disambiguator 24 can then filter the divided areas for size, location, and aspect ratio so that each individual human can be identified within the crowd of humans. Thus, the disambiguator 24 can disambiguate an individual human from a crowd of humans so that each individual human can be identified within the crowd of humans.

It should be noted that the disambiguator 24 can also filter areas of a YUV mask image according to other characteristics such as, for example, texture and color.

In view of the foregoing, it will be recognized that the disambiguator 24 can be used to disambiguate an individual object from a plurality of objects so that each individual object can be identified within the plurality of objects.

Once an individual object has been identified by either the classifier 22 or the disambiguator 24, the tracker 26 can track the object through a succession of digitized images. The tracker 26 operates by matching areas in a "current" YUV-mask image that were identified by either the classifier 22 or the disambiguator 24 as areas containing a human with areas in "prior" YUV-mask images that were also identified by either the classifier 22 or the disambiguator 24 as areas containing a human. A current YUV-mask image is typically a YUV-mask image 64 that is formed from a background image and a recently captured source image. A prior YUV-mask image is typically a YUV-mask image 64 that is formed from a background image and a source image that is captured prior to the recently captured source image. Prior YUV-mask images are typically stored in the memory 31.

The tracker 26 first compares each area in the current YUV-mask image that was identified by either the classifier 22 or the disambiguator 24 as an area containing a human with each area in the prior YUV-mask images that was identified by either the classifier 22 or the disambiguator 24 as an area containing a human. A score is then established for each pair of compared areas. The score may be calculated as a weighted sum of the differences in size between the compared areas, the differences in location between the compared areas, the differences in aspect ratio between the compared areas, the differences in texture between the compared areas, and the differences in color, or the color accuracy, between the compared areas.

The differences in size, location, and aspect ratio between the compared areas can be calculated using the size, location, and aspect ratio information that was utilized by the classifier 22 as described above. Color accuracy is measured by taking small samples of color from selected corresponding locations in each pair of compared areas. The color samples are actually taken from the source images from which the current and prior YUV-mask images were formed since the YUV-mask images themselves do not contain color characteristics, only difference characteristics. That is, color samples are taken from an area in a source image which corresponds to an area in an current or prior YUV-mask image which is formed from the source image. For example, a color sample may be taken from an area in a "current" source image which corresponds to an area in an associated current YUV-mask image. Likewise, a color sample may be taken from an area in a "prior" source image which corresponds to an area in an associated prior YUV-mask image. The color samples are therefore taken in selected corresponding locations in source images from which current and prior YUV-mask images which are formed, wherein the selected corresponding locations in the source images correspond to selected corresponding locations in areas in the current and prior YUV-mask images which are to be compared.

Figure 14:
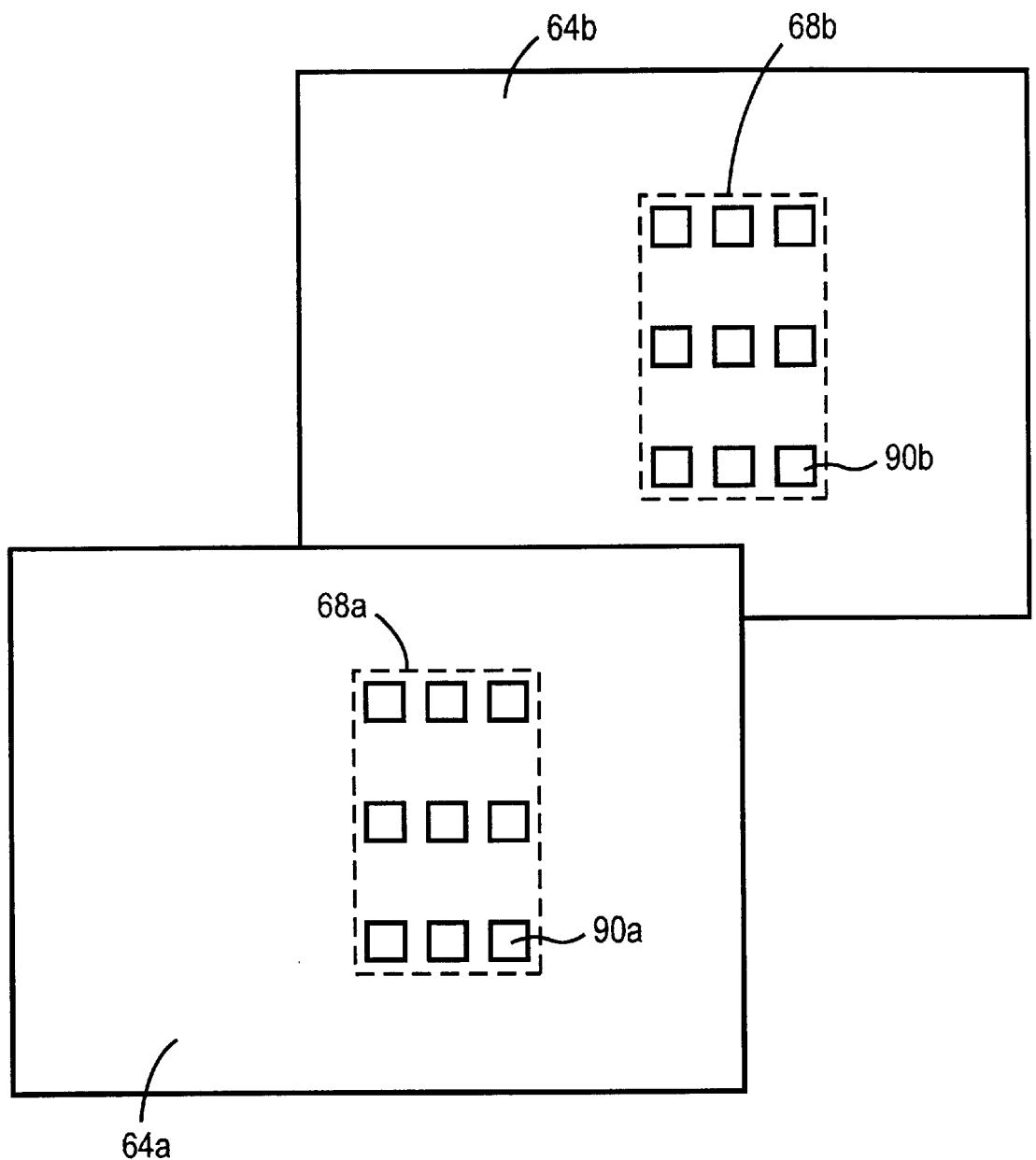
FIG. 14 shows a sampled area in a current YUV-mask image and a prior YUV-mask image in accordance with the present invention.

Referring to FIG. 14, there is shown a current YUV-mask image 64a and a prior YUV-mask image 64b. The current and prior YUV-mask images 64a and 64b each have an area 68a and 68b, respectively, that has been identified by either the classifier 22 or the disambiguator 24 as an area containing a human. Color samples 90a and 90b are taken from selected corresponding locations in the areas 68a and 68b in the current and prior YUV-mask images 64a and 64b, respectively.

There are several methods that can be used to select the corresponding locations in the areas 68a and 68b in the current and prior YUV-mask images 64a and 64b, respectively. One method is to select corresponding locations arranged in a grid pattern within each of the YUV-mask image areas 68a and 68b. Typically, each grid pattern is distributed uniformly within each of the YUV-mask image areas 68a and 68b. For example, a grid pattern may consist of nine uniformly spaced patches arranged in three columns and three rows, as shown in FIG. 14. The color samples 90a and 90b are taken from the nine selected corresponding locations in the areas 68a and 68b in the current and prior YUV-mask images 64a and 64b, respectively.

A second method is to select corresponding locations arranged in a grid pattern within each of the YUV-mask image areas 68a and 68b wherein a corresponding location is used only if the color samples 90a and 90b each contain more than a given threshold of enabled pixels.

Figure 15:
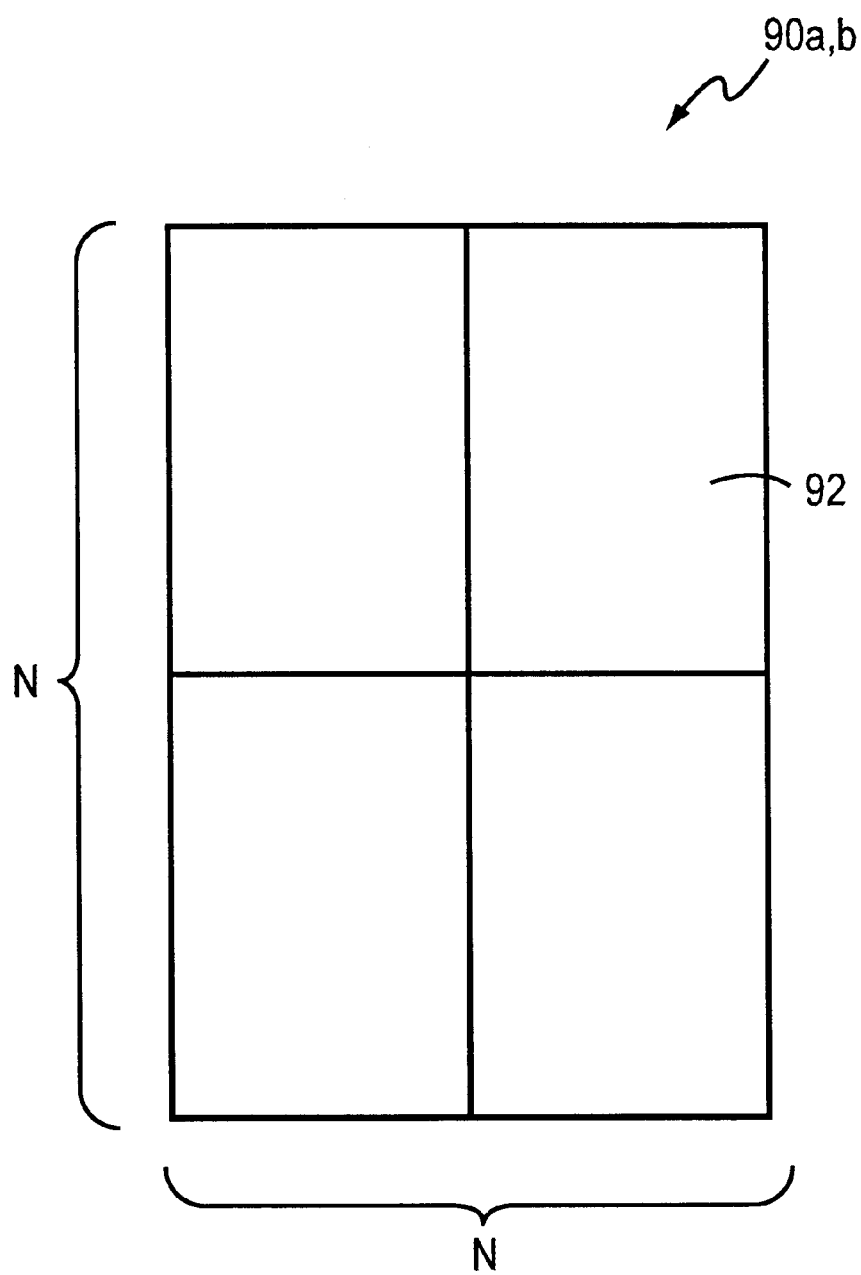
FIG. 15 shows an NxN color sample in accordance with the present invention.

Referring to FIG. 15, each color sample 90a or 90b may consist of an N×N sample square of pixels 92. For example, N may equal two. The color values of the pixels 92 within each sample square are averaged. To compare two areas, a subset of the best color matches between corresponding color samples from each compared area are combined to provide a measure of color accuracy between the compared areas. For example, the best five color matches from nine color samples taken from each area 68a and 68b from the corresponding current and prior YUV-mask images 64a and 64b may be used to determine color accuracy. The use of a subset of the color matches is beneficial because it can enable tracking in the presence of partial occlusions. This measure of color accuracy is combined with the differences in size, location, aspect ratio, and texture of the compared areas to establish a score for each pair of compared areas.

The scores that are established for each pair of compared areas are sorted and placed in an ordered list (L) from highest score to lowest score. Scores below a threshold value are removed from the list and discarded. The match with the highest score is recorded by the tracker as a valid match. That is, the compared area in the prior YUV-mask image is considered to be a match with the compared area in the current YUV-mask image. This match and any other match involving either of these two compared areas is removed from the ordered list of scores. This results in a new ordered list (L'). The operation of selecting the highest score, recording a valid match, and removing elements from the ordered list is repeated until no matches remain.

The tracker 26 works reliably and quickly. It can accurately track a single object (e.g., a human) moving through the frames 34 in the video sequence of temporally ordered frames 35, as well as multiple objects (e.g., several humans) which may temporarily obstruct or cross each others paths.

Because the age of each frame 34 is known, the tracker 26 can also determine the velocity of a matched area. The velocity of a matched area can be determined by differencing the centroid position of a matched area (i.e., the center of mass of the matched area) in a current YUV-mask image with the centroid position of a corresponding matched area in a prior YUV-mask image. The differencing operation is performed in both the X and Y coordinates. The differencing operation provides a difference value that corresponds to a distance that the matched area in the current YUV-mask image has traveled in relation to the corresponding matched area in the prior YUV-mask image. The difference value is divided by the amount of time that has elapsed between the "current" and "prior" frames to obtain the velocity of the matched area.

It should be noted that the velocity of a matched area can be used as a filtering mechanism since it is often known how fast an object (e.g., a human) can travel. In this case, however, the filtering would be performed by the tracker 26 rather than the classifier 22 or the disambiguator 24.

In view of the foregoing, it will be recognized that the vision system 10 can be used to identify an object in each of a succession of digitized images. The object can be animate, inanimate, real, or virtual. Once the object is identified, the object can be tracked through the succession of digitized images.

Figure 16:
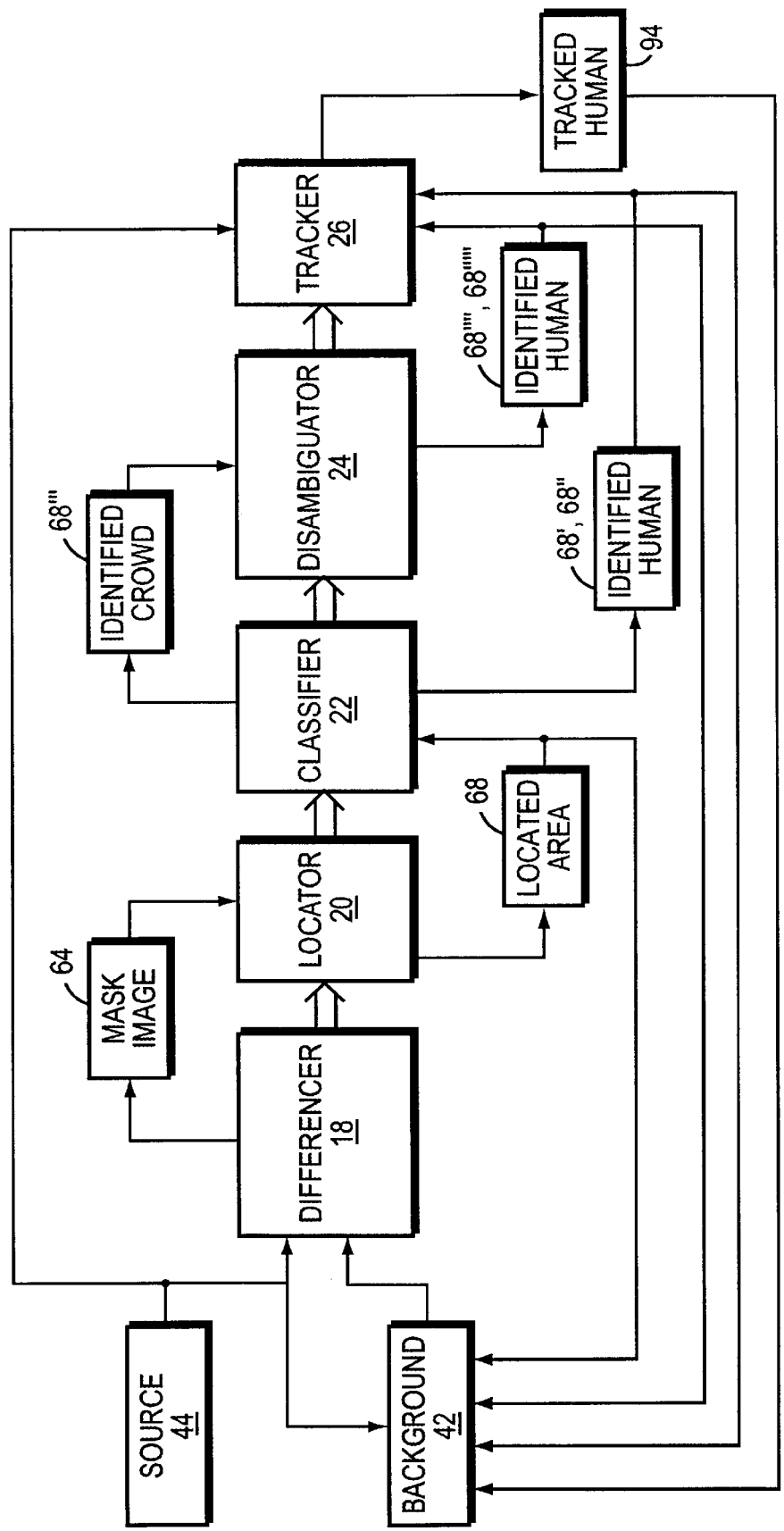
FIG. 16 is a data flow diagram for a vision system in accordance with the present invention.

Referring to FIG. 16, there is shown a data flow diagram for the vision system 10. Background image data 42 is provided to the differencer 18. Source image data 44 is provided to the differencer 18 and to the tracker 26. The differencer 18 provides mask image data 64 to the locator 20. The locator 20 provides located area data 68 to the classifier 22. The classifier 22 provides identified human data 68' and 68" to the tracker 26, and identified crowd data 68''' to the disambiguator 24. The disambiguator 24 provides identified human data 68'''' and 68''''' to the tracker 26. As previously described, background image data 42 is typically formed with source image data 44, located area data 68 from the locator 20, identified human data 68' and 68" from the classifier 22, identified human data 68'''' and 68''''' from the disambiguator 24, and tracked human data 94 from the tracker 26.

The present invention is not to be limited in scope by the specific embodiment described herein. Indeed, various modifications of the present invention, in addition to those described herein, will be apparent to those of skill in the art from the foregoing description and accompanying drawings. Thus, such modifications are intended to fall within the scope of the appended claims.

What is claimed is:

1. A method for locating objects within an image, wherein an object is represented by a plurality of enabled pixels within the image, the method comprising the steps of:

defining a first representation of the image, the first representation having a plurality of first pixels, obtaining a second and a third representation of the image; the second representation having a plurality of second pixels, and the third representation having a plurality of third pixels, forming the plurality of first pixels by taking the difference between the plurality of second pixels and the plurality of third pixels, wherein at least some of the plurality of first pixels are enabled and represent the object, defining at least two orientations of the object;

counting the number of enabled plurality of first pixels along the each of the two orientations;

defining a threshold as a quantity of the plurality of first pixels counted;

identifying portions of the plurality of first pixels exceeding the threshold; and identifying the object within the image based upon the orientation and the identified portions of the plurality of first pixels exceeding the threshold of the object within the image.

2. The method as defined in claim 1, wherein the step of identifying an object within the image based upon an orientation of the object within the image includes the steps or:

grouping together substantially adjacent identified portions of the representation; and identifying areas of the representation corresponding to each group of substantially adjacent identified portions of the representation.

3. The method as defined in claim 2, wherein the step of identifying an object within the image based upon an orientation of the object within the image further includes the steps of:

recording the locations of the outermost enabled pixels within each group of substantially adjacent identified portions of the representation; and framing areas of the representation coinciding with the locations of the outermost enabled pixels within each group of substantially adjacent identified portions of the representation.

4. The method as defined in claim 3, wherein the plurality of pixels are also configured having a third orientation, wherein the step of identifying an object within the image based upon an orientation of the object within the image further includes the steps of:

counting each enabled pixel in each framed area along the third orientation; and identifying portions of each framed area having a quantity of enabled pixels exceeding a threshold value.

5. The method as defined in claim 4, wherein the step of identifying an object within the image based upon an orientation of the object within the image further includes the steps of:

grouping together substantially adjacent identified portions of each framed area; and identifying areas of each framed area corresponding to each group of substantially adjacent identified portions of each framed area.

6. The method as defined in claim 5, wherein the step of identifying an object within the image based upon an orientation of the object within the image further includes the steps of:

recording the locations of the outermost enabled pixels within each group of substantially adjacent identified portions of each framed area; and framing areas of each framed area coinciding with the locations of the outermost enabled pixels within each group of substantially adjacent identified portions of each framed area.

7. The method as defined in claim 4, wherein the second orientation and the first orientation are orthogonal.

8. The method as defined in claim 1, wherein the image is a representation of a plurality of pixels, wherein the plurality of pixels are arranged in a plurality of columns, wherein at least some of the plurality of pixels are enabled to represent the object, wherein the step of identifying an object within the image based upon an orientation of the object within the image includes the steps of:

counting each enabled pixel in each of the plurality of columns; and identifying each of the plurality of columns having a quantity of enabled pixels exceeding a threshold value.

9. The method as defined in claim 8, wherein the step of identifying an object within the image based upon an orientation of the object within the image further includes the steps of:

grouping together substantially adjacent identified columns; and identifying areas of the representation corresponding to each group of substantially adjacent identified columns.

10. The method as defined in claim 9, wherein the step of identifying an object within the image based upon an orientation of the object within the image further includes the steps of:

recording the locations of the outermost enabled pixels within each group of substantially adjacent identified columns; and framing areas of the representation coinciding with the locations of the outermost enabled pixels within each group of substantially adjacent identified columns.

11. The method as defined in claim 1, wherein the image is a representation of a plurality of pixels, wherein the plurality of pixels are arranged in a plurality of rows, wherein at least some of the plurality of pixels are enabled to represent the object, wherein the step of identifying an object within the image based upon an orientation of the object within the image includes the steps of:

counting each enabled pixel in each of the plurality of rows; and identifying each of the plurality of rows having a quantity of enabled first pixels exceeding a threshold value.

12. The method as defined in claim 11, wherein the step of identifying an object within the image based upon an orientation of the object within the image further includes the steps of:

grouping together substantially adjacent identified rows; and identifying areas of the representation corresponding to each group of substantially adjacent identified rows.

13. The method as defined in claim 12, wherein the step of identifying an object within the image based upon an orientation of the object within the image further includes the steps of:

recording the locations of the outermost enabled pixels within each group of substantially adjacent identified rows; and framing areas of the representation coinciding with the locations of the outermost enabled first pixels within each group of substantially adjacent identified rows.

14. The method as defined in claim 1, wherein the image is a representation of a plurality of pixels, wherein the plurality of pixels are arranged in a plurality of columns and rows, wherein at least some of the plurality of pixels are enabled to represent the object, wherein the step of identifying an object within the image based upon an orientation of the object within the image includes the steps of:

counting each enabled pixel in each of the plurality of columns and rows;

identifying each of the plurality of columns having a quantity of enabled pixels exceeding a column threshold value; and identifying each of the plurality of rows having a quantity of enabled pixels exceeding a row threshold value.

15. The method as defined in claim 14, wherein the step of identifying an object within the image based upon an orientation of the object within the image further includes the steps of:

grouping together substantially adjacent identified columns;

grouping together substantially adjacent identified rows;

identifying areas of the representation corresponding to each group of substantially adjacent identified columns; and identifying areas of the representation corresponding to each group of substantially adjacent identified rows.

16. The method as defined in claim 15, wherein the step of identifying an object within the image based upon an orientation of the object within the image further includes the steps of:

recording the locations of the outermost enabled pixels within each group of substantially adjacent identified columns;

recording the locations of the outermost enabled pixels within each group of substantially adjacent identified rows;

framing areas of the representation coinciding with the locations of the outermost enabled pixels within each group of substantially adjacent identified columns; and framing areas of the representation coinciding with the locations of the outermost enabled pixels within each group of substantially adjacent identified rows.

17. The method as defined in claim 16, wherein the step of identifying an object within the image based upon an orientation of the object within the image further includes the steps of:

overlaying the areas of the representation that were framed to coincide with the locations of the outermost enabled pixels within each group of substantially adjacent identified columns with the areas of the representation that were framed to coincide with the locations of the outermost enabled pixels within each group of substantially adjacent identified rows; and identifying common overlayed areas as areas of the representation that contain a significant number of enabled pixels.

18. The method as defined in claim 1, wherein the image is a first representation of a plurality of first pixels representing a difference between a second representation of a plurality of second pixels and a third representation of a plurality of third pixels, wherein each of the plurality of first pixels is enabled to represent a difference between a corresponding one of the plurality of second pixels and a corresponding one of the plurality of third pixels, wherein the object is represented by at least some of the enabled first pixels.

19. An apparatus for locating objects within an image, wherein the object is represented by a plurality of enabled pixels within the image, the apparatus comprising:

a first representation of the image, the first representation having a plurality of first pixels, an obtainer for obtaining a second and a third representation of the image; the second representation having a plurality of second pixels, and the third representation having a plurality of third pixels, the plurality of first pixels formed by taking the difference between the plurality of second pixels and the plurality of third pixels, wherein at least some of the plurality of first pixels are enabled and represent the object, means for defining at least two orientations of the object;

a counter of the number of enabled plurality of first pixels along the each of the two orientations;

means for defining a threshold as a quantity of the plurality of first pixels counted;

a first identifier of portions of the plurality of first pixels exceeding the threshold; and a second identifier for identifying the object within the image based upon the orientation and the identified portions of the plurality of first pixels exceeding the threshold of the object within the image.

20. The apparatus as defined in claim 19, wherein the first identifier further includes:

a first grouper for grouping together substantially adjacent identified portions of the representation; and a third identifier for identifying areas of the representation corresponding to each group of substantially adjacent identified portions of the representation.

21. The apparatus as defined in claim 20, wherein the first identifier further includes:

a first recorder for recording the locations of the outermost enabled pixels within each group of substantially adjacent identified portions of the representation; and a first framer for framing areas of the representation coinciding with the locations of the outermost enabled pixels within each group of substantially adjacent identified portions of the representation.

22. The apparatus as defined in claim 21, wherein the plurality of pixels are also configured having a third orientation, wherein the first identifier further includes:

a second counter for counting each enabled pixel in each framed area along the third orientation; and a fourth identifier for identifying portions of each framed area having a quantity of enabled pixels exceeding a threshold value.

23. The apparatus as defined in claim 22, wherein the first identifier further includes:

a second grouper for grouping together substantially adjacent identified portions of each framed area; and a fifth identifier for identifying areas of each framed area corresponding to each group of substantially adjacent identified portions of each framed area.

24. The apparatus as defined in claim 23, wherein the first identifier further includes;

a second recorder for recording the locations of the outermost enabled pixels within each group of substantially adjacent identified portions of each framed area; and a second framer for framing areas of each framed area coinciding with the locations of the outermost enabled pixels within each group of substantially adjacent identified portions of each framed area.

25. The apparatus as defined in claim 22, wherein the second orientation and the first orientation are orthogonal.

26. The apparatus as defined in claim 19, wherein the image is a representation of a plurality of pixels, wherein the plurality of pixels are arranged in a plurality of columns, wherein at least some of the plurality of pixels are enabled to represent the object, wherein the first identifier includes:

a counter for counting each enabled pixel in each of the plurality of columns; and a second identifier for identifying each of the plurality of columns having a quantity of enabled pixels exceeding a threshold value.

27. The apparatus as defined in claim 26, wherein the first identifier further includes:

a grouper for grouping together substantially adjacent identified columns; and a third identifier for identifying areas of the representation corresponding to each group of substantially adjacent identified columns.

28. The apparatus as defined in claim 27, wherein the first identifier further includes:
- a recorder for recording the locations of the outermost enabled pixels within each group of substantially adjacent identified columns; and
- a framer for framing areas of the representation coinciding with the locations of the outermost enabled pixels within each group of substantially adjacent identified columns.

29. The apparatus as defined in claim 19, wherein the image is a representation of a plurality of pixels, wherein the plurality of pixels are arranged in a plurality of rows, wherein at least some of the plurality of pixels are enabled to represent the object, wherein the first identifier includes:
- a counter for counting each enabled pixel in each of the plurality of rows; and
- a second identifier for identifying each of the plurality of rows having a quantity of enabled first pixels exceeding a threshold value.

30. The apparatus as defined in claim 29, wherein the first identifier further includes:
- a grouper for grouping together substantially adjacent identified rows; and
- a third identifier for identifying areas of the representation corresponding to each group of substantially adjacent identified rows.

31. The apparatus as defined in claim 30, wherein the first, identifier further includes:
- a recorder for recording the locations of the outermost enabled pixels within each group of substantially adjacent identified rows; and
- a framer for framing areas of the representation coinciding with the locations of the outermost enabled first pixels within each group of substantially adjacent identified rows.

32. The apparatus as defined in claim 19, wherein the image is a representation of a plurality of pixels, wherein the plurality of pixels are arranged in a plurality of columns and rows, wherein at least some of the plurality of pixels are enabled to represent the object, wherein the first identifier includes:
- a counter for counting each enabled pixel in each of the plurality of columns and rows;
- a second identifier for identifying each of the plurality of columns having a quantity of enabled pixels exceeding a column threshold value; and
- a third identifier for identifying each of the plurality of rows having a quantity of enabled pixels exceeding a row threshold value.

33. The apparatus as defined in claim 32, wherein the first identifier further includes:
- a first grouper for grouping together substantially adjacent identified columns;
- a second grouper for grouping together substantially adjacent identified rows;
- a fourth identifier for identifying areas of the representation corresponding to each group of substantially adjacent identified columns; and
- a fifth identifier for identifying areas of the representation corresponding to each group of substantially adjacent identified rows.

34. The apparatus as defined in claim 33, wherein the first identifier further includes:
- a first recorder for recording the locations of the outermost enabled pixels within each group of substantially adjacent identified columns;
- a second recorder for recording the locations of the outermost enabled pixels within each group of substantially adjacent identified rows;
- a first framer for framing areas of the representation coinciding with the locations of the outermost enabled pixels within each group of substantially adjacent identified columns; and
- a second framer for framing areas of the representation coinciding with the locations of the outermost enabled pixels within each group of substantially adjacent identified rows.

35. The apparatus as defined in claim 34, wherein the first identifier further includes:
- an overlayer for overlaying the areas of the representation that were framed to coincide with the locations of the outermost enabled pixels within each group of substantially adjacent identified columns with the areas of the representation that were framed to coincide with the locations of the outermost enabled pixels within each group of substantially adjacent identified rows; and
- a sixth identifier for identifying common overlayed areas as areas of the representation that contain a significant number of enabled pixels.

36. The apparatus as defined in claim 19, wherein the image is a first representation of a plurality of first pixels representing a difference between a second representation of a plurality of second pixels and a third representation of a plurality of third pixels, wherein each of the plurality of first pixels is enabled to represent a difference between a corresponding one of the plurality of second pixels and a corresponding one of the plurality of third pixels, wherein the object is represented by at least some of the enabled first pixels.

37. An article of manufacture for locating objects within an image, wherein the object is represented by a plurality of enabled pixels within the image, the article of manufacture comprising:
- a computer readable storage medium; and
- computer programming stored on the storage medium; wherein the stored computer programming is configured to be readable from the computer readable storage medium by a computer and thereby cause the computer to operate so as to:
  - define a first representation of the image, the first representation having a plurality of first pixels,
  - obtain a second and a third representation of the image; the second representation having a plurality of second pixels, and the third representation having a plurality of third pixels,
  - the plurality of first pixels formed by taking the difference between the plurality of second pixels and the plurality of third pixels, wherein at least some of the plurality of first pixels are enabled and represent the object,
  - define at least two orientations of the object;
  - count the number of enabled plurality of first pixels along the each of the two orientations;
  - define a threshold as a quantity of the plurality of first pixels counted;
  - identify of portions of the plurality of of first pixels exceeding the threshold; and
  - identify the object within the image based upon the orientation and the identified portions of the plurality of first pixels exceeding the threshold of the object within the image.

38. The article of manufacture as defined in claim 37, further causing the computer to operate so as to:

group together substantially adjacent identified portions of the representation; and identify areas of the representation corresponding to each group of substantially adjacent identified portions of the representation.

39. The article of manufacture as defined in claim 38, further causing the computer to operate so as to:

record the locations of the outermost enabled pixels within each group of substantially adjacent identified portions of the representation; and frame areas of the representation coinciding with the locations of the outermost enabled pixels within each group of substantially adjacent identified portions of the representation.

40. The article of manufacture as defined in claim 39, wherein the plurality of pixels are also configured having a third orientation, further causing the computer to operate so as to:

count each enabled pixel in each framed area along the third orientation; and identify portions of each framed area having a quantity of enabled pixels exceeding a threshold value.

41. The article of manufacture as defined in claim 40, further causing the computer to operate so as to:

group together substantially adjacent identified portions of each framed area; and identify areas of each framed area corresponding to each group of substantially adjacent identified portions of each framed area.

42. The article of manufacture as defined in claim 41, further causing the computer to operate so as to:

record the locations of the outermost enabled pixels within each group of substantially adjacent identified portions of each framed area; and frame areas of each framed area coinciding with the locations of the outermost enabled pixels within each group of substantially adjacent identified portions of each framed area.

43. The article of manufacture as defined in claim 40, wherein the second orientation and the first orientation are orthogonal.

44. The article of manufacture as defined in claim 37, wherein the image is a representation of a plurality of pixels, wherein the plurality of pixels are arranged in a plurality of columns, wherein at least some of the plurality of pixels are enabled to represent the object, further causing the computer to operate so as to:

count each enabled pixel in each of the plurality of columns; and identify each of the plurality of columns having a quantity of enabled pixels exceeding a threshold value.

45. The article of manufacture as defined in claim 44, further causing the computer to operate so as to:

group together substantially adjacent identified columns; and identify areas of the representation corresponding to each group of substantially adjacent identified columns.

46. The article of manufacture as defined in claim 45, further causing the computer to operate so as to:

record the locations of the outermost enabled pixels within each group of substantially adjacent identified columns; and frame areas of the representation coinciding with the locations of the outermost enabled pixels within each group of substantially adjacent identified columns.

47. The article of manufacture as defined in claim 37, wherein the image is a representation of a plurality of pixels, wherein the plurality of pixels are arranged in a plurality of rows, wherein at least some of the plurality of pixels are enabled to represent the object, further causing the computer to operate so as to:

count each enabled pixel in each of the plurality of rows; and identify each of the plurality of rows having a quantity of enabled first pixels exceeding a threshold value.

48. The article of manufacture as defined in claim 47, further causing the computer to operate so as to:

group together substantially adjacent identified rows; and identify areas of the representation corresponding to each group of substantially adjacent identified rows.

49. The article of manufacture as defined in claim 48, further causing the computer to operate so as to:

record the locations of the outermost enabled pixels within each group of substantially adjacent identified rows; and frame areas of the representation coinciding with the locations of the outermost enabled first pixels within each group of substantially adjacent identified rows.

50. The article of manufacture as defined in claim 37, wherein the image is a representation of a plurality of pixels, wherein the plurality of pixels are arranged in a plurality of columns and rows, wherein at least some of the plurality of pixels are enabled to represent the object, further causing the computer to operate so as to:

count each enabled pixel in each of the plurality of columns and rows;

identify each of the plurality of columns having a quantity of enabled pixels exceeding a column threshold value; and identify each of the plurality of rows having a quantity of enabled pixels exceeding a row threshold value.

51. The article of manufacture as defined in claim 50, further causing the computer to operate so as to:

group together substantially adjacent identified columns;

group together substantially adjacent identified rows;

identify areas of the representation corresponding to each group of substantially adjacent identified columns; and identify areas of the representation corresponding to each group of substantially adjacent identified rows.

52. The article of manufacture as defined in claim 51, further causing the computer to operate so as to:

record the locations of the outermost enabled pixels within each group of substantially adjacent identified columns;

record the locations of the outermost enabled pixels within each group of substantially adjacent identified rows;

frame areas of the representation coinciding with the locations of the outermost enabled pixels within each group of substantially adjacent identified columns; and frame areas of the representation coinciding with the locations of the outermost enabled pixels within each group of substantially adjacent identified rows.

53. The article of manufacture as defined in claim 52, further causing the computer to operate so as to:

overlay the areas of the representation that were framed to coincide with the locations of the outermost enabled pixels within each group of substantially adjacent identified columns with the areas of the representation that were framed to coincide with the locations of the outermost enabled pixels within each group of substantially adjacent identified rows; and identify common overlayed areas as areas of the representation that contain a significant number of enabled pixels.

54. The article of manufacture as defined in claim 37, wherein the image is a first representation of a plurality of first pixels representing a difference between a second representation of a plurality of second pixels and a third representation of a plurality of third pixels, wherein each of the plurality of first pixels is enabled to represent a difference between a corresponding one of the plurality of second pixels and a corresponding one of the plurality of third pixels, wherein the object is represented by at least some of the enabled first pixels.

* * * * *